United States Patent [19]

Habashy et al.

[11] Patent Number: 5,345,179
[45] Date of Patent: Sep. 6, 1994

[54] LOGGING EARTH FORMATIONS WITH ELECTROMAGNETIC ENERGY TO DETERMINE CONDUCTIVITY AND PERMITTIVITY

[75] Inventors: Tarek M. Habashy, Danbury; M. Reza Taherian, Ridgefield, both of Conn.; Alain Dumont, Tokyo, Japan; Jeffrey A. Beren, Westport, Conn.

[73] Assignee: Schlumberger Technology Corporation, New York, N.Y.

[21] Appl. No.: 848,621

[22] Filed: Mar. 9, 1992

[51] Int. Cl.$^5$ .............................. G01V 3/30
[52] U.S. Cl. ........................ 324/338; 364/422
[58] Field of Search .................... 324/338–343; 364/422

[56] References Cited

U.S. PATENT DOCUMENTS

| | | | |
|---|---|---|---|
| 3,849,721 | 11/1974 | Calvert | 324/6 |
| 3,944,910 | 3/1976 | Rau | 324/6 |
| 4,340,934 | 7/1982 | Segesman | 364/422 |
| 4,468,623 | 8/1984 | Gianzero et al. | 324/367 |
| 4,567,759 | 2/1986 | Ekstrom et al. | 73/152 |
| 4,652,829 | 3/1987 | Safinya | 324/338 |
| 4,689,572 | 8/1987 | Clark | 324/341 |
| 4,692,908 | 9/1987 | Ekstrom et al. | 367/27 |
| 4,704,581 | 11/1987 | Clark | 324/341 |
| 4,766,384 | 8/1988 | Kleinberg et al. | 324/339 |
| 4,831,331 | 5/1989 | De et al. | 324/338 |
| 4,857,852 | 8/1989 | Kleinberg et al. | 324/339 |
| 4,979,151 | 12/1989 | Ekstrom et al. | 367/35 |
| 5,066,916 | 11/1990 | Rau | 324/338 |

*Primary Examiner*—Walter E. Snow
*Attorney, Agent, or Firm*—Martin M. Novack; Leonard W. Pojunas

[57] ABSTRACT

A form of the disclosure is directed to determining properties of formations surrounding an earth borehole having a standoff layer. A method is disclosed for determining the conductivity and permittivity of the standoff layer and the conductivity and permittivity of the formations adjacent the standoff layer. A further form of the disclosure is directed to an electromagnetic logging apparatus having transmitting and receiving antennas in RTTR, RRTTRR or TTRRTT arrangements.

31 Claims, 12 Drawing Sheets

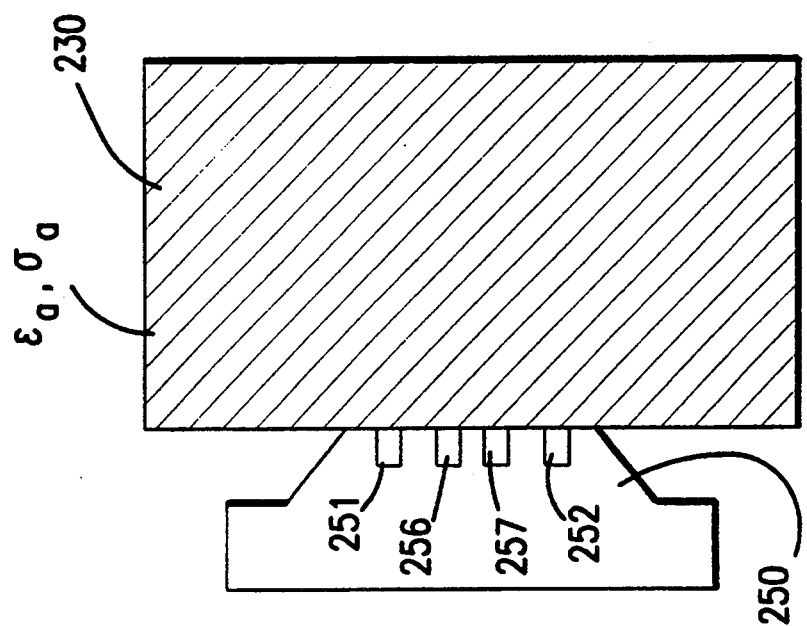
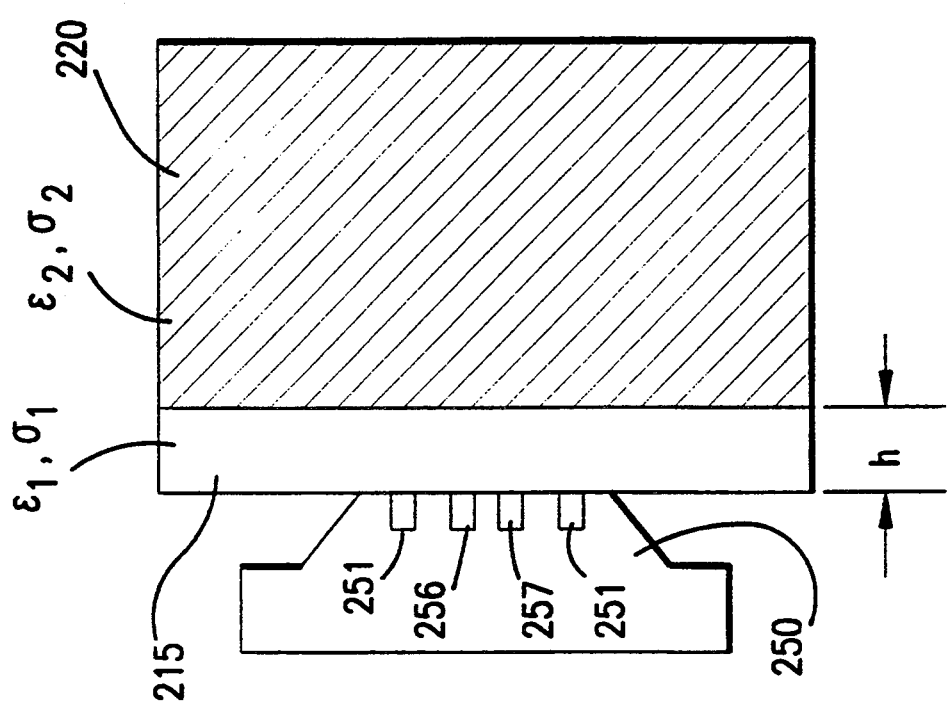
FIG.2B
FIG.2A

_5,345,179_

LOGGING EARTH FORMATIONS WITH ELECTROMAGNETIC ENERGY TO DETERMINE CONDUCTIVITY AND PERMITTIVITY

RELATED APPLICATIONS

The subject matter of this application is related to subject matter disclosed in U.S. patent application Ser. No., 07/848,576, now U.S. Pat. No. 5,210,495 and assigned to the same assignee as the present application. The subject matter of this application is also related to subject matter disclosed in U.S. patent application Ser. No. 706,454, filed May 24, 1991, of K. Safinya, T. Habashy, and J. Beren, assigned to the same assignee as the present application, now abandoned.

FIELD OF THE INVENTION

This invention relates to logging of earth boreholes and, more particularly, to an apparatus and method of logging using electromagnetic energy.

BACKGROUND OF THE INVENTION

The measurement of dielectric constant (or dielectric permittivity) of formations surrounding a borehole is known to provide useful information about the formations. The dielectric constant of the different materials of earth formations vary widely (for example, 2.2 for oil, 7.5 limestone, and 80 for water), so measurement of dielectric properties is a useful means of formation evaluation.

A logging device which measures formation dielectric constant is disclosed in the U.S. Pat. No. 3,944,910. The logging device includes a transmitter and spaced receivers mounted in a pad that is urged against the borehole wall. Microwave electromagnetic energy is transmitted into the formations, and energy which has propagated through the formations is received at the receiving antennas. The phase shift and attenuation of the energy propagating in the formations is determined from the receiver output signals. The dielectric constant and, if desired, the conductivity of the formations can then be obtained from the phase and attenuation measurements. Measurements are typically, although not necessarily, made on the formation invaded zone. Two transmitters are generally used in a borehole compensated array to minimize the effect of borehole rugosity, tool tilt, and dissimilarities in the transmitters, receivers, and their circuits. [See, for example, U.S. Pat. No. 3,849,721.]

The antennas shown in U.S. Pat. No. 3,944,910 are slot antennas, each having a probe that extends across the slot in a direction parallel to the longitudinal direction of the borehole. This configuration has become known as a "broadside" array. The U.S. Pat. No. 4,704,581 describes a logging device of similar type, but wherein the slot antennas have probes that extend in a direction perpendicular to the longitudinal direction of the borehole. This configuration has become known as an "endfire" array. The endfire array exhibits a deeper depth of investigation and is less affected by tool standoff (e.g. from mudcake) than the broadside array. On the other hand, the broadside array exhibits a stronger signal characteristic than the endfire array and may be preferred in relatively lossy (low resistivity) logging environments.

A logging device which utilizes teachings of the above-referenced U.S. Pat. Nos. 3,944,910 and 4,704,581 is the electromagnetic propagation tool ("EPT"—mark of Schlumberger). A so-called adaptable EPT ("ADEPT") can provide either broadside operation or endfire operation during a given logging run, depending on conditions. The ADEPT logging tool has two changeable pads, one containing a broadside antenna array and the other an endfire antenna array.

Notwithstanding the described advances in electromagnetic pad devices which determine permittivity and conductivity of the formation invaded zone, in various circumstances difficulties can arise in the obtainment of accurate measurements. Consider, for example, the simplified models of FIGS. 2A and 2B. In FIG. 2A an EPT type of pad 250 is shown adjacent a standoff layer 215 (e.g. a mudcake) and formations 220. The pad 250 has transmitters 251, 252 and receivers 256, 257 in a conventional EPT borehole compensated arrangement. The formations have a dielectric permittivity $\epsilon_f'$ and a conductivity $\sigma_f$, and the standoff layer has a thickness $h_m$, a dielectric permittivity $\epsilon_m'$, and a conductivity $\sigma_m$. Typically, the measurements taken by the EPT device (of which pad 250 is a part) include the attenuation and phase of microwave electromagnetic energy propagating between the transmitters and receivers. These two measurements are insufficient to determine the five unknowns (h, $\epsilon_f$, $\sigma_f$, $\epsilon_m'$, and $\sigma_m$) or even four unknowns in cases where h is known from other measurement(s). Accordingly, an approach that has been taken is to consider the standoff layer and formations as a composite medium, labelled 230 in FIG. 2B, having a dielectric permittivity $\epsilon_c$ and a conductivity $\sigma_c$. This approach can result in incorrect conclusions about the nature of the formations, the standoff layer, or both.

It is among the objects of the present invention to provide an improvement in the determination of properties of the formations and the standoff layer in the propagation logging of earth boreholes. It is also among the objects of the present invention to provide improved techniques and equipment for the accurate determination of properties of subsurface formations using electromagnetic energy having a magnetic dipole characteristic.

SUMMARY OF THE INVENTION

A form of the present invention is directed to determining electrical parameters of formations [which means, generically invaded or uninvaded formations] and of a standoff layer [defined herein as a mudcake, mudlayer or other layer between the formations and the antennas of the logging device]. An apparatus and technique for practicing this form of the present invention utilizes electromagnetic energy having a magnetic dipole characteristic with a first magnetic dipole direction and further electromagnetic energy having a magnetic dipole characteristic with a second magnetic dipole direction. In copending U.S. patent application Ser. No. 706,454, of K. Safinya, T. Habashy, and J. Beren, filed May 24, 1991, now abandoned, and assigned to the same assignee as the present application, there is disclosed a so-called "cross-dipole" antenna that can be energized to produce electromagnetic energy having a magnetic dipole characteristic with a selectable magnetic moment direction. These antennas can be used, for example, to obtain an endfire operating configuration at a particular time and a broadside operating configuration at another time. The antennas, described in some further detail hereinbelow, can be used in practicing certain embodiments of the present invention.

In accordance with an embodiment of the invention there is disclosed an improvement in determining properties of formations surrounding an earth borehole having a standoff layer which is traversed by a logging device having transmitting and receiving antennas. A method is disclosed for determining the conductivity and permittivity of the standoff layer and the conductivity and permittivity of the formations adjacent the standoff layer. [In the present application, any references to determination or use of conductivity are intended to generically mean resistivity as well, and vice versa. These quantities are reciprocals, and mention of one or the other herein is for convenience of description, and not intended in a limiting sense.] The method comprises the following steps:

a) deriving first measured signal values from electromagnetic energy transmitted into the formations and received from the formations by the device, the electromagnetic energy having a magnetic dipole characteristic with a first magnetic dipole direction;

b) deriving second measured signal values from further electromagnetic energy transmitted into the formations and received from the formations by the device, the further electromagnetic energy having a magnetic dipole characteristic with a second magnetic dipole direction that is different than the first magnetic dipole direction;

c) selecting model values of standoff layer permittivity, standoff layer conductivity, formation permittivity, and formation conductivity;

d) computing first model signal values based on a model of electromagnetic energy, having a magnetic dipole characteristic with said first magnetic dipole direction, propagating in a model medium that includes a standoff layer having said model values of standoff layer permittivity and standoff layer conductivity and formations having said model values of formation permittivity and formation conductivity;

e) computing second model signal values based on a model of electromagnetic energy, having a magnetic dipole characteristic with said second magnetic dipole direction, propagating in a model medium that includes standoff layer having said model values of standoff layer permittivity and standoff layer conductivity and formations having said model values of formation permittivity and formation conductivity;

f) computing an error from the difference between the first model signal values and the first measured signal values and the difference between the second model signal values and the second measured signal values;

g) modifying the model values of step (c);

h) repeating steps (d) through (g) until a predetermined criterion of said error is met; and i) outputting the model values of standoff layer permittivity, standoff layer conductivity, formation permittivity, and formation conductivity. The described embodiment can be used when the thickness of the standoff layer is known a priori, or when it is not known. In the latter case, further measured signal values are obtained at different depths of investigation and used to determine standoff layer thickness as well as the indicated electrical parameters of the formations and of the standoff layer.

In a further form of the invention an apparatus is disclosed for determining properties of formations surrounding an earth borehole. A logging device is moveable through the borehole. A member is mounted on the logging device and adapted for engagement with the borehole wall. A linear array comprising six spaced apart slot antennas are mounted in the member. Means are provided for energizing at least two of the antennas to transmit electromagnetic energy into the formations. Means are provided for receiving, at the non-energized antennas, the electromagnetic energy. Means are also provided for determining the relative phase shift and the relative attenuation of the received electromagnetic energy. This form of the invention can be operated in either a TTRRTT configuration or an RRTTRR configuration, and provides measurement information at further depths of investigation. In an embodiment of this form of the invention, each of the antennas is a cross-dipole antenna having orthogonal probes in its slot.

In a still further form of the invention, an RTTR arrangement of slot antennas is employed.

Further features and advantages of the invention will become more readily apparent from the following detailed description when taken in conjunction with the accompanying drawings.

BRIEF DESCRIPTION OF THE DRAWINGS

FIG. 2A is a simplified representation of a pad of an electromagnetic propagation logging device adjacent a model of a standoff layer and a formation.

FIG. 2B is a simplified representation of a pad of an electromagnetic propagation logging device adjacent a model of composite formation.

DETAILED DESCRIPTION

Figure 1:
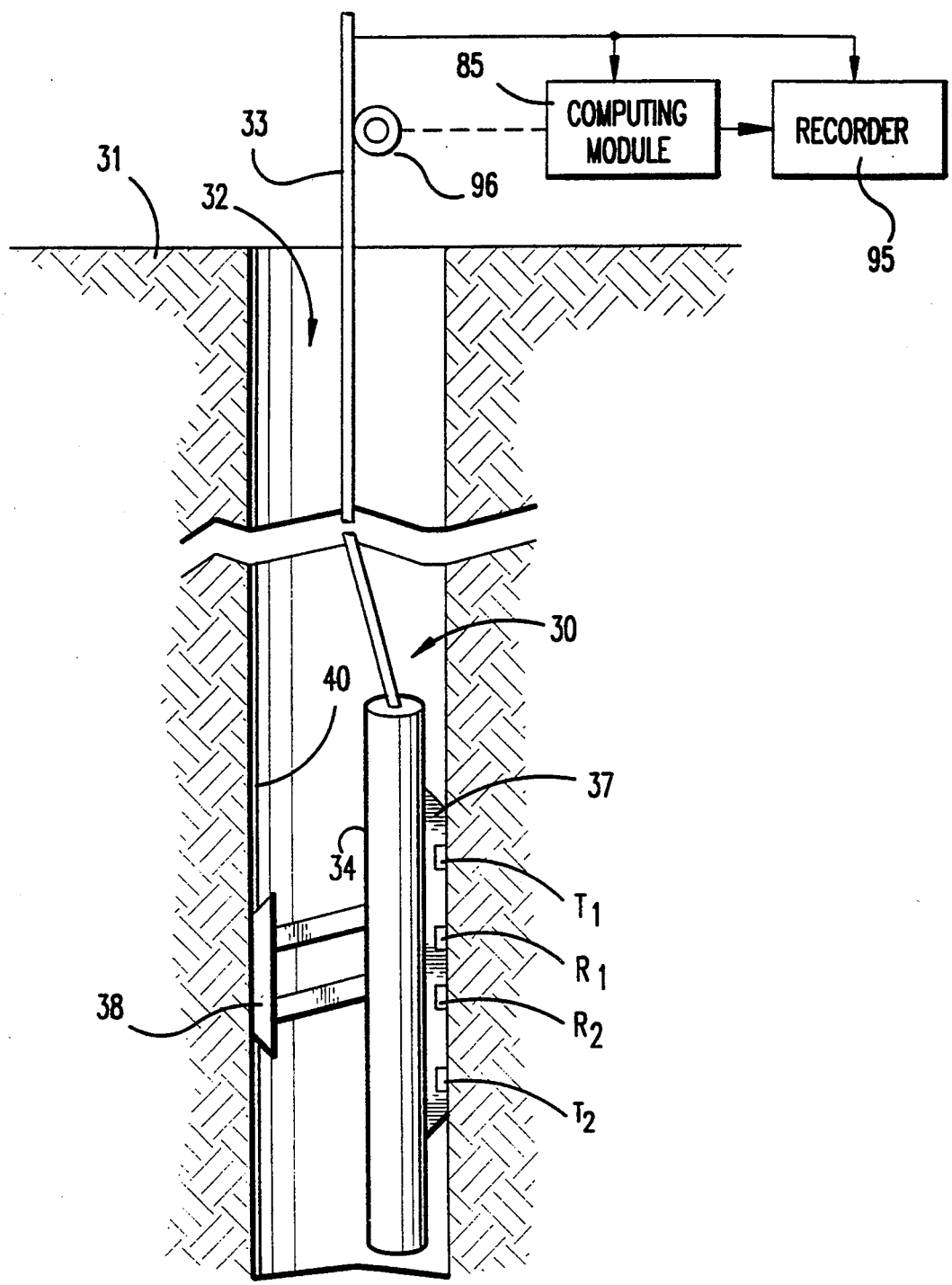
FIG. 1 is a schematic representation, partially in block diagram form, of apparatus which can be used in practicing embodiments of the invention.

Referring to FIG. 1, there is shown an apparatus 30, for investigating subsurface formations 31 traversed by a borehole 32, which can be used in practicing embodiments of the invention. The borehole 32 is typically filled with a drilling fluid or mud which contains finely divided solids in suspension. Generally, the fluid pressure in the formations traversed by the borehole is less than the hydrostatic pressure of the column of mud in the borehole, so that the mud and mud filtrate flow somewhat into the formations. As is well known, the formations tend to screen the small particles suspended in the mud so that a mudcake 40 can form on the walls of the borehole.

The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The logging device 30 includes an elongated cylindrical sonde 34, the interior portion of which has a housing containing the bulk of the downhole electronics. Mounted on one side of sonde 34 is a pad 37 which contains, inter alia, vertically spaced transmitting antennas T1 and T2, and vertically spaced receiving antennas R1 and R2 between the transmitting antennas. On the other side of sonde 34 is mounted a backup arm 38 which may be hydraulically controlled to maintain the pad 37 in contact with the borehole wall. The backup arm 38 can also be used to provide a caliper reading. [The pad 37 mounted directly on the sonde 34 is sometimes also referred to as a skid. The term "pad" is used herein and is intended to generically indicate an intention of contact with the surface of the borehole wall.] The particular means shown in FIG. 1 for maintaining the antennas in engagement with the borehole wall is illustrative, and it will be appreciated that other known suitable means for accomplishing this objective can be utilized. In embodiments hereof, signals are stored downhole by memory associated with a downhole processor, but it will be understood that some or all signals could be transmitted uphole for processing and/or storage. Electronic signals indicative of the information obtained by the logging device can be transmitted through the cable 33 to a computing module 85 and a recorder 95, located at the surface of the earth. Depth information to the recorder 95 and computing module 85 can be provided from a rotating wheel 96 that is coupled to the cable 33. The computing module 85 will typically include a processor, and associated memory, timing, input/output, display, and printing functions, none of which are separately shown.

Figure 3:
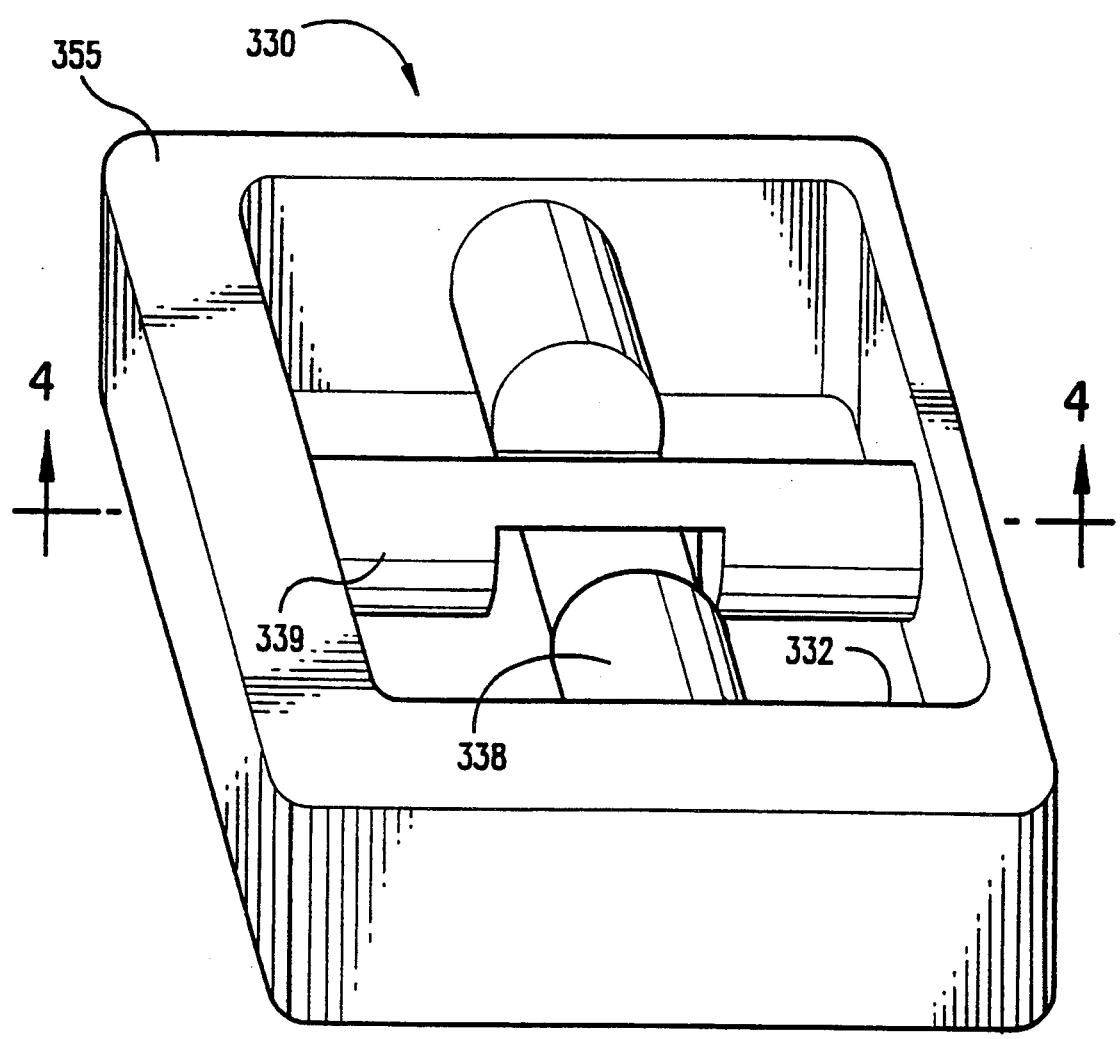
FIG. 3 is an elevational perspective view of a cross-dipole antenna that can be used in embodiments of the invention.
Figure 4:
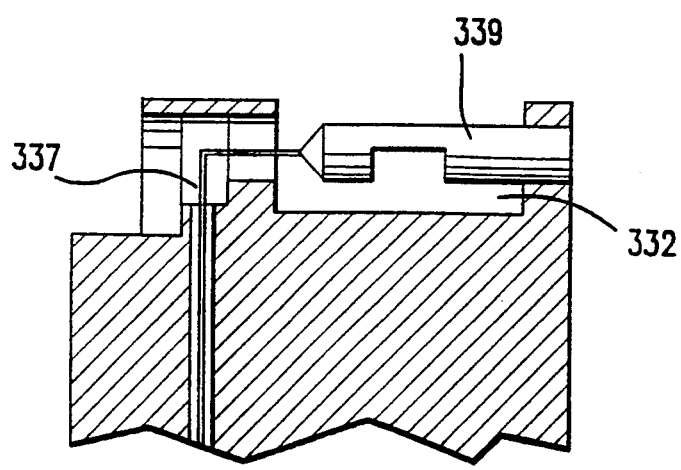
FIG. 4 is a cross-sectional view as taken through a section defined by arrows 4—4 of FIG. 3.

As first noted above, in copending U.S. patent application Ser. No. 706,454, now abandoned, there is disclosed a cross-dipole antenna that can be energized to produce electromagnetic energy having a magnetic dipole characteristic. FIGS. 3 and 4 show the cross dipole antenna, which is used in the embodiments hereof. The antenna 330 comprises a generally square aperture or slot 332 in a metal body 355. Metal probe elements 338 and 339 cross the slot from different opposing sides, but are notched at their centers, so as to not touch where they cross. A dielectric material fills the rest of the slot. The cross-section of FIG. 4 shows one of the probes (339), which is seen to be shorted at one end to a wall of the slot 332. The other end of the probe is coupled to a conductor wire 337 which is insulated for passage through the body, and is coupled with transmitter and/or receiver circuitry, depending on the intended purpose of the antenna. The other probe is similarly constructed.

Figure 5B:
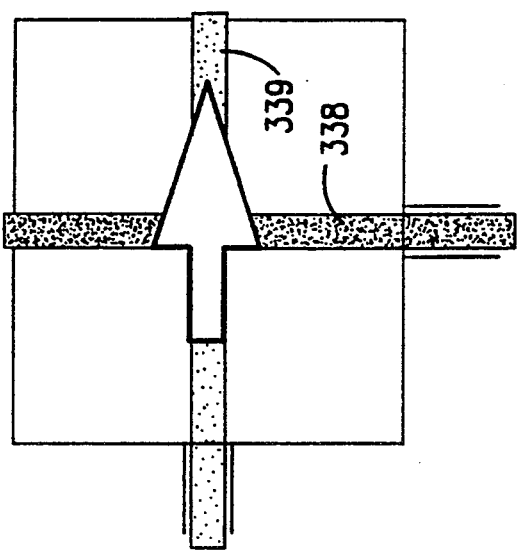
FIGS. 5A, 5B and 5C illustrate magnetic dipole moments that can be obtained with the antenna of FIG. 3.
Figure 5C:
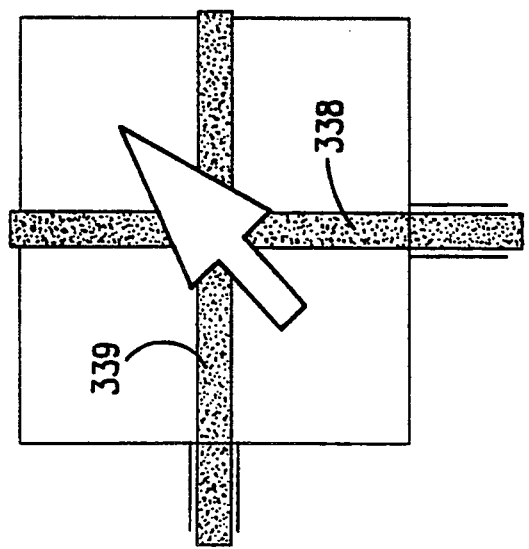
Figure 5A:
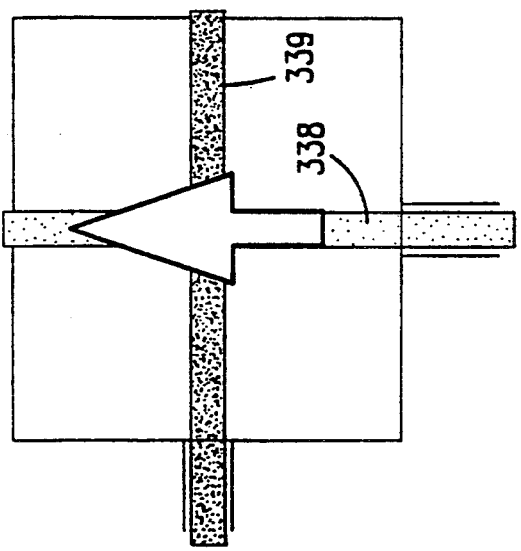

As described in the referenced copending U.S. patent application Ser. No. 706,454, now abandoned, the cross-dipole antenna probes can be used to produce electromagnetic energy with a controlled magnetic moment direction. Referring, for example, to FIG. 5A, assume that the vertical probe element 339 is parallel to the longitudinal axis of the logging device and that the horizontal element 338 is perpendicular to said axis. Excitation of only the horizontal probe element (shown darkened) results in a vertical magnetic moment (as indicated by the arrow) and operation in an endfire mode. In the illustration of FIG. 5B, only the vertical probe element is excited, resulting in a horizontal magnetic moment and operation in a broadside mode. In FIG. 5C both probe elements are excited by application of equal signals to the probe elements, resulting in a 45 degree magnetic moment, as shown. As further described in the referenced copending Application, application of signals of appropriate relative amplitudes and phases to the respective probe elements can produce a magnetic moment in any desired direction. Also, the antennas can be excited to operate in endfire and broadside modes either sequentially or simultaneously (an example of the latter being simultaneous transmission or reception at slightly different frequencies, such as 1.03 GHz and 1.00 GHz, which are substantially equivalent from a rock physics standpoint but which reduce cross-coupling between the probes).

Figure 6:
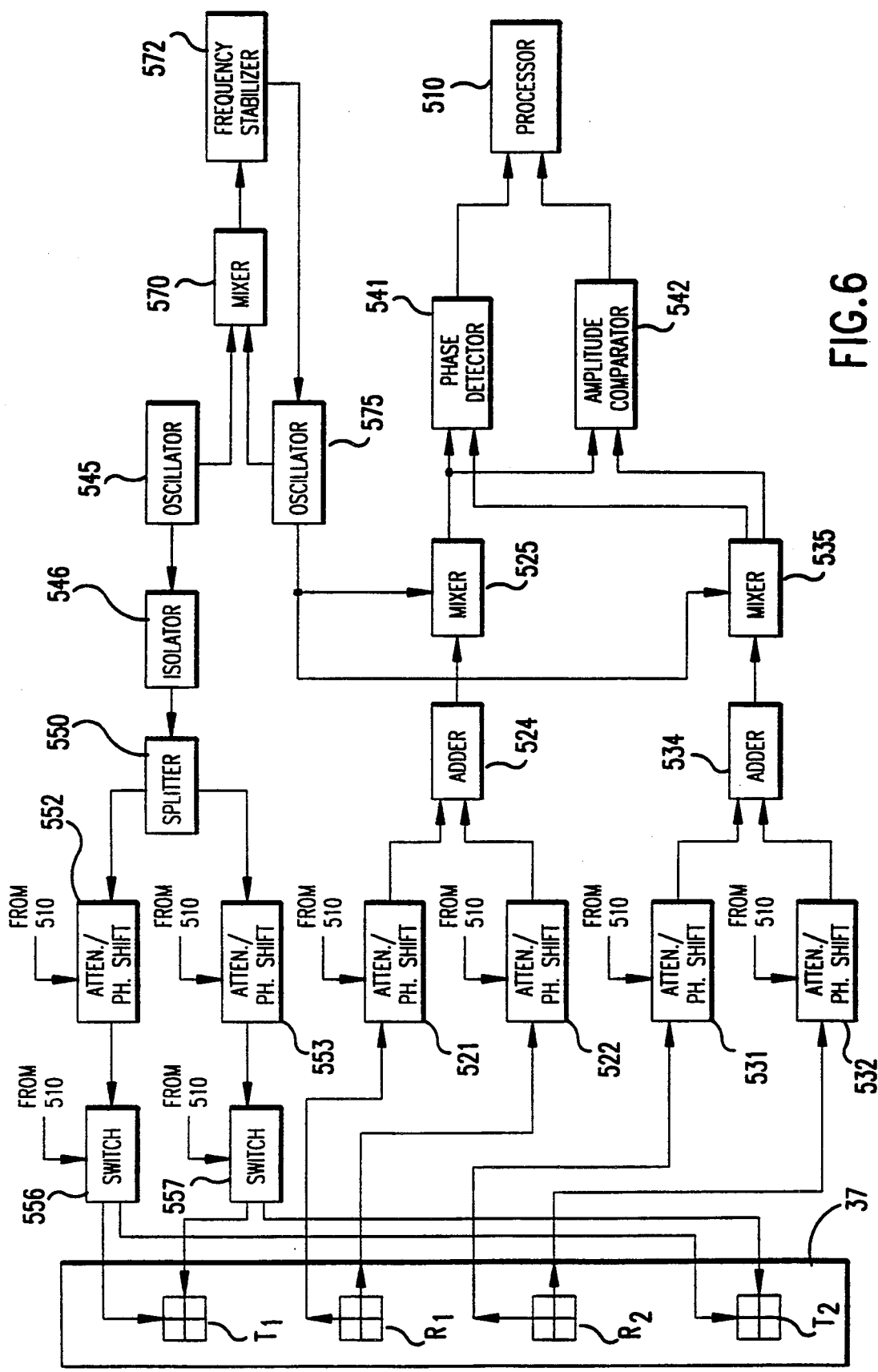
FIG. 6 is a schematic diagram, partially in block form, of antennas and circuitry utilized in an embodiment of the invention.

FIG. 6 illustrates a form of the pad 37 in accordance with an embodiment of the invention, and which contains the transmitting and receiving cross-dipole antennas in a longitudinally spaced borehole compensated arrangement $T_1$, $R_1$, $R_2$, $T_2$. FIG. 6 also shows the electronics which may be contained within the sonde 34. An oscillator 545 provides output energy which, in the present invention, is preferably greater than 100 MHz, and, in the example hereof is 1100 MHz. The output of oscillator 545 is coupled through isolator 546 to a splitter 550 which divides the input signal into two parts of prescribed proportions. The outputs of the splitter 550 are then passed through respective attenuator/phase-shifter circuits 552 and 553. These and other attenuator/phase-shifters hereof also have the capability of varying amplitude under processor control. The outputs of attenuator/phase-shifters 552 and 553 are respectively coupled to switching circuits 556 and 557. The illustrated outputs of switch 557 are respectively coupled to the horizontal probes of transmitting antennas $T_1$ and $T_2$; that is, the probes which can excite the previously described endfire mode of operation. The illustrated outputs of switch 556 are respectively coupled to the vertical probes of antennas $T_1$ and $T_2$; that is, the probes which can excite the previously described broadside mode of operation.

The horizontal probes of the receiving antennas $R_1$ and $R_2$ are respectively coupled to attenuator/phase-shifters 522 and 532, and the vertical probes of the antennas $R_1$ and $R_2$ are respectively coupled to attenuator/phase-shifters 521 and 531. The receiver outputs can also be directly recorded, in this and all embodiments. The outputs of attenuator/phase-shifters 521 and 522 are coupled to an adding circuit 524 whose output is coupled to one input of a mixer 525. The outputs of attenuator/phase-shifters 531 and 532 are coupled to an adding circuit 534 whose output is coupled to one input of mixer 535. The outputs of mixers 525 and 535 are inputs to a phase detector 541 and are also inputs to an amplitude comparator 542. The outputs of phase detector 541 and amplitude comparator 542 are coupled to a downhole processor 510, which may be, for example a digital processor having associated memory, timing, and input/output capabilities (not separately shown). The processor controls switches 556 and 557, and also controls attenuator/phase-shifters 552, 553, 521, 522, 531 and 532. A second input to mixers 525 and 525 is the output of a voltage-controlled oscillator 575 which is under control of a frequency stabilizer circuit 572. The outputs of oscillators 545 and 575 are coupled to mixer 570, the output of which is coupled to frequency stabilizer 572.

In the illustrated embodiment transmitters T1 and T2 are alternately enabled to implement "borehole compensated" operation, in this case by switches 556 and 557. In the present embodiment electromagnetic energy is transmitted sequentially from transmitters T1 and T2 into the surrounding media. Each of the switches 556, 557 can pass signal to one of its illustrated outputs or can pass no signal, depending on the control signal from processor 510. The processor can thus readily sequence energizing of the four transmitter probes. Energy received at the receiving antennas is coupled via the attenuator/phase-shifters and adders to inputs of the mixers 525 and 535. The signals which arrive from the receivers are out of phase with each other by a phase angle which depends upon properties of the media through which the energy has passed and have an amplitude ratio which also depends upon properties of such media. The secondary inputs of the mixers are supplied with energy at a frequency that is separated from the transmitter frequency by some relatively low frequency which is typically in the kilohertz frequency range. In the illustrated embodiment, oscillator 575 supplies electromagnetic energy to mixers 525 and 535 at a frequency that is, for example, 10 KHz. Above the transmitter frequency. The outputs of the mixers 525 and 535 therefore contain the difference frequency of 10 KHz. In accordance with well known principles, the mixer outputs maintain the phase and amplitude relationships of the signals from the receivers, but the task of phase detection is greatly facilitated at the lower frequency of the mixed signals. To ensure that the difference frequency between the outputs of the oscillators 545 and 575 remains at 10 KHz, the oscillator outputs are sampled and fed to the mixer 570. The output of the mixer is received by the frequency stabilization circuit 572 which detects drifts from the 10 KHz standard and generates a correction signal which controls oscillator 575 in the manner of a conventional "phase-locked loop". As above-indicated, the mixer outputs are applied to the phase detector 541 and to the amplitude comparator 542. The output of the phase detector 541 is a signal level which is proportional to the phase difference between the signals received at the receivers and the output of amplitude comparator 542 is a signal level which is proportional to the relative amplitudes of the signals received at the receivers. The sequence of operation for borehole-compensated operation of FIG. 6 can be implemented by controlling the switches 556 and 557 as follows: transmit from $T^1$ in endfire mode; transmit from $T_2$ in endfire mode; transmit from $T_1$ in broadside mode; transmit from $T_2$ in broadside mode; and then repeat for next depth level.

The attenuator/phase-shifters 552 and 553 can control the phase and the amplitude of the energizing signals to control the direction of the magnetic moment of the electromagnetic signal transmitted from the individual antennas, $T_1$, $T_2$, as described in the above-referenced copending U.S. patent application Ser. No. 706,454. The attenuator/phase-shifters 521, 522, 531 and 532 coupled with the receivers can provide further flexibility in synthesizing the desired magnetic moment direction. In the illustrated embodiments hereof, only the endfire and broadside modes are used, and can be obtained by energizing one or the other of the probes in the transmitting antennas. The amplitude control functions of the receiver attenuator/phase-shifters are used in these embodiments for selectively disabling the receiver cross-dipole probes not being used at a given time. In particular, when an endfire mode is transmitted, the processor 510 controls attenuator/phase-shifters 521 and 531 to pass no signal, and when the broadside mode is transmitted, the processor 510 controls attenuator/phase-shifters 522 and 532 to pass no signal. This prevents inclusion of a cross-talk signal from the receiver probe that is parallel to the direction of the magnetic moment direction of the transmitted electromagnetic energy. If desired the various attenuator/phase-shifters could also be used to obtain other magnetic moment directions for use in practicing variations on the illustrated embodiments. For example, data can be obtained using electromagnetic energy with magnetic dipole directions other than those described herein.

Figure 7:
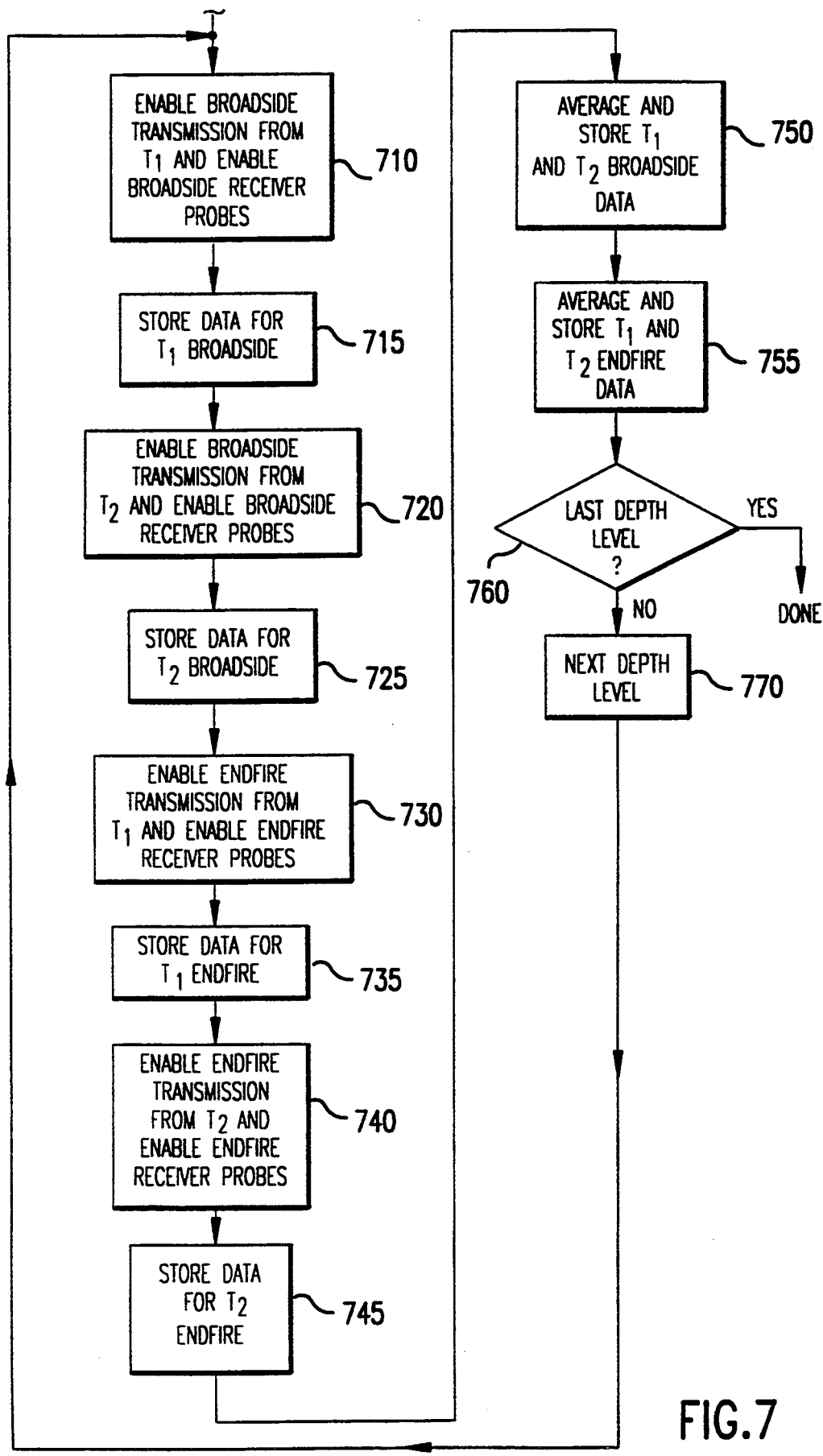
FIG. 7 is a flow diagram of a routine for controlling the downhole processor to obtain and store measurement information.

Referring to FIG. 7, there is shown a flow diagram of a routine for controlling the processor 510 of FIG. 6 to transmit, receive, and store attenuation and phase data. The block 710 represents the enabling of broadside mode transmission from transmitter $T_1$ and enabling of obtainment of receiver signals from receiver probes oriented to receive the broadside mode. In particular, the processor will control switch 556 to pass no signal, will control switch 557 to pass signal to the $T_1$ probe that produces a broadside mode, and will control phase shifters 521 and 531 to pass no signal, so that only the probes of $R_1$ $R_2$ which couple efficiently to the broadside mode signal will be ultimately coupled to the phase detector 541 and the amplitude comparator 542. Data is stored for the $T_1$ broadside mode, as represented by the block 715. Similarly, the blocks 720, 730, and 740 respectively represent transmission from $T_2$ in broadside mode, $T_1$ in endfire mode, and $T_2$ in endfire mode, with enablement of the appropriate receiver signals in each case. The blocks 725, 735, and 745 respectively represent the storage of data for the indicated respective modes. The block 750 is then entered, this block representing the averaging and storing of the phase detector and amplitude comparator values obtained from $T_1$ and $T_2$ broadside data in order to obtain borehole compensated values of attenuation and phase. The block 755 represents the same averaging, but for the endfire mode data. Inquiry is then made (diamond 760 as to whether the last depth level of a zone being logged has been reached. If not, the block 770 is entered, this block representing the initiation of data collection for the next depth level, which is implemented by re-entry to the block 710. It will be understood that other sequences of operation can be used and, as noted above, simultaneous operation is also possible.

Consider a two layer model of standoff layer and formation of the type first described in conjunction with FIG. 2A, with measurements taken by a device of the type described in conjunction with FIG. 6.

The signal at a receiver at a spacing $\rho$ from the transmitter for a broadside configuration is given by $$F_b(\rho) = \frac{M_b}{\pi}\left[\frac{k_1^2}{2\rho}\left(1 + \frac{i}{k_1\rho} - \frac{1}{(k_1\rho)^2}\right)e^{ik_1\rho} + \right. \tag{1}$$

$$ik_1^2 \int_0^\infty dk_\rho \frac{k_\rho}{k_{1z}} J_1(k_\rho\rho) \frac{R_{12}^{TM} e^{i2k_{1z}h}}{1 - R_{12}^{TM} e^{i2k_{1z}h}} -$$

$$\left.\frac{i}{\rho}\int_0^\infty dk_\rho k_{1z} J_1(k_\rho\rho) \frac{R_{12}^{TE} e^{i2k_{1z}h}}{1 + R_{12}^{TE} e^{i2k_{1z}h}}\right]$$

where $M_b$ is the magnetic dipole moment, h is the thickness of the standoff layer, i is the imaginary operator, $J_1$ is the first order Bessel function and $J_1'$ its derivative with respect to its argument, reflection coefficients are $$R_{12}^{TE} = \frac{k_{1z} - k_{2z}}{k_{1z} + k_{2z}} \tag{2}$$

$$R_{12}^{TM} = \frac{\epsilon_2 k_{1z} - \epsilon_1 k_{2z}}{\epsilon_2 k_{1z} + \epsilon_1 k_{2z}} \tag{3}$$

where $k_{1z}$ and $k_{2z}$ are defined by $$k_{1z}^2 = k_1^2 - k_\rho^2, \; Im\{k_{1z}\} > 0 \tag{4}$$

$$k_{2z}^2 = k_2^2 - k_\rho^2, \; Im\{k_{2z}\} > 0 \tag{5}$$

with $k_1$ and $k_2$ the complex propagation constants in the standoff layer and the formation, respectively, and $k_\rho$ the dummy variable of integration. The propagation constants are defined by $$k_1^2 = \omega^2 \mu \epsilon_1 \tag{6}$$

$$k_2^2 = \omega^2 \mu \epsilon_2 \tag{7}$$

where $\omega$ is the angular frequency of the transmitted electromagnetic energy, $\mu$ is the magnetic permeability (considered a constant herein) and $\epsilon_1$ and $\epsilon_2$ are the complex permittivities of the standoff layer and the formation, respectively. The complex permittivities are $$\epsilon_1 = \epsilon_1' + i\sigma_1/\omega\epsilon_0 \tag{8}$$

$$\epsilon_2 = \epsilon_2' + i\sigma_2/\omega\epsilon_0 \tag{9}$$

where $\epsilon_1'$ and $\epsilon_2'$ are the real parts of the permittivity of the standoff layer and the formation, respectively, $\sigma_1$ and $\rho_2$ are the conductivities of the standoff layer and the formation, respectively, and $\epsilon_0$ is the permittivity of free space. The tool response for the broadside configuration (e.g. FIG. 5B) can be represented as the ratio of the far receiver signal to the near receiver signal, that is $$S_b = \frac{F_b(\rho_2)}{F_b(\rho_1)} \tag{10}$$

If the complex quantity $S_b$ is represented as $$S_b = S_{br} + S_{bi}i ; \tag{10a}$$

where $S_{br}$ and $S_{bi}$ are, respectively, the real and imaginary parts of $S_b$, the attenuation $\alpha_b$ (in dB) and phase $\phi_b$ for the broadside mode can be represented as:

$$\alpha_b = 20\log\sqrt{S_{br}^2 + S_{bi}^2} \tag{10b}$$

$$\phi_b = \tan^{-1}(S_{bi}/S_{br}) \tag{10c}$$

The signal at a receiver spacing $\rho$ from the transmitter for the endfire configuration is given by $$F_e(\rho) = \frac{iM_e}{\pi}\left[-\frac{k_1}{\rho^2}\left(1 + \frac{i}{k_1\rho}\right)e^{ik_1\rho} + \right. \tag{11}$$

$$\frac{k_1^2}{\rho}\int_0^\infty dk_\rho \frac{1}{k_{1z}} J_1(k_\rho\rho) \frac{R_{12}^{TM} e^{i2k_{1z}h}}{1 - R_{12}^{TM} e^{i2k_{1z}h}} -$$

$$\left.\int_0^\infty dk_\rho k_\rho k_{1z} J_1'(k_\rho\rho) \frac{R_{12}^{TE} e^{i2k_{1z}h}}{1 + R_{12}^{TE} e^{i2k_{1z}h}}\right]$$

where $M_e$ is the magnetic dipole moment, and the other variables and constants are as previously defined. The tool response for the endfire configuration (e.g. FIG. 5A) can be represented as the ratio of the far receiver signal to the near receiver signal, that is $$S_e = \frac{F_e(\rho_2)}{F_e(\rho_1)} \tag{12}$$

If the complex quantity $S_e$ is represented as $$S_e = S_{er} + S_{ei}i \tag{12a}$$

where $S_{er}$ and $S_{ei}$ are, respectively, the real and imaginary parts of $S_e$, the attenuation $\alpha_e$ (in dB) and phase $\Phi_e$ for the endfire mode can be represented as:

$$\alpha_e = 20\log\sqrt{S_{er}^2 + S_{ei}^2} \tag{12b}$$

$$\phi_e = \tan^{-1}(S_{ei}/S_{er}) \tag{12c}$$

In an embodiment hereof, model values of permittivity and conductivity are selected for each of the layers of the two layer model; i.e., model values of $\epsilon_1'$, $\sigma_1$, $\epsilon_2'$, and $\sigma_2$. Stated another way, model values are selected for the two complex permittivities, $\epsilon_1$ and $\epsilon_2$ [see equations (8) and (9)]. The complex model values are designated $\epsilon_{10}$ and $\epsilon_{20}$, respectively. The model broadside and endfire responses can be computed from equations (10) and (12) as $S_b$ and $S_e$. The measured responses obtained from the equipment of FIG. 6 are designated $S_{bm}$ and $S_{em}$, respectively. The complex response $S_{bm}$ can be obtained from the measured attenuation $\alpha_{bm}$ and the measured phase difference $\Phi_{bm}$ as $$S_{bm} = 10^{\frac{\alpha_{bm}}{20}} e^{i\phi_{bm}} \quad (13)$$

Similarly, the complex response $S_{em}$ can be obtained from the measured attenuation $\alpha_{em}$ and the measured phase difference $\Phi_{bm}$ as $$S_{em} = 10^{\frac{\alpha_{em}}{20}} e^{i\phi_{em}} \quad (13a)$$

The complex error components, that is the differences between the model responses and the measured responses for the broadside and endifre modes are $$b = S_b - S_{bm} \quad (14)$$

$$e = S_e - S_{em} \quad (14a)$$

and a vector $\overline{M}$ of error components defined as $$\overline{M} = \begin{bmatrix} e \\ b \end{bmatrix} \quad (15)$$

The gradient of the error is $$G = \begin{bmatrix} \frac{\partial e}{\partial \epsilon_1} & \frac{\partial e}{\partial \epsilon_2} \\ \frac{\partial b}{\partial \epsilon_1} & \frac{\partial b}{\partial \epsilon_2} \end{bmatrix} \quad (16)$$

Employing, for example, a Newton-Raphson method [also called a Gauss-Newton method, see for example, P. E. Gill et al., "Practical Optimization", Academic Press, Inc., London, 1981, pp. 134–136], modified model values can be obtained from a step in the gradient direction as $$\overline{\epsilon} = \overline{\epsilon}_0 - G^{-1} \cdot \overline{M} \quad (17)$$
where $$\overline{\epsilon} = \begin{bmatrix} \epsilon_1 \\ \epsilon_2 \end{bmatrix} \quad (18)$$

$$\overline{\epsilon}_0 = \begin{bmatrix} \epsilon_{10} \\ \epsilon_{20} \end{bmatrix} \quad (19)$$

Explicitly, equation (17) gives $$\epsilon_1 = \epsilon_{10} - \frac{e \frac{\partial b}{\partial \epsilon_2} - b \frac{\partial e}{\partial \epsilon_2}}{\frac{\partial e}{\partial \epsilon_1} \frac{\partial b}{\partial \epsilon_2} - \frac{\partial b}{\partial \epsilon_1} \frac{\partial e}{\partial \epsilon_2}} \quad (20)$$

$$\epsilon_2 = \epsilon_{20} - \frac{b \frac{\partial e}{\partial \epsilon_1} - e \frac{\partial b}{\partial \epsilon_1}}{\frac{\partial b}{\partial \epsilon_2} \frac{\partial e}{\partial \epsilon_1} - \frac{\partial e}{\partial \epsilon_2} \frac{\partial b}{\partial \epsilon_1}} \quad (21)$$

The computed $\epsilon_1$ and $\epsilon_2$ can then be used as model values for the next iteration, and the process continued until the error is acceptably small.

Figure 8:
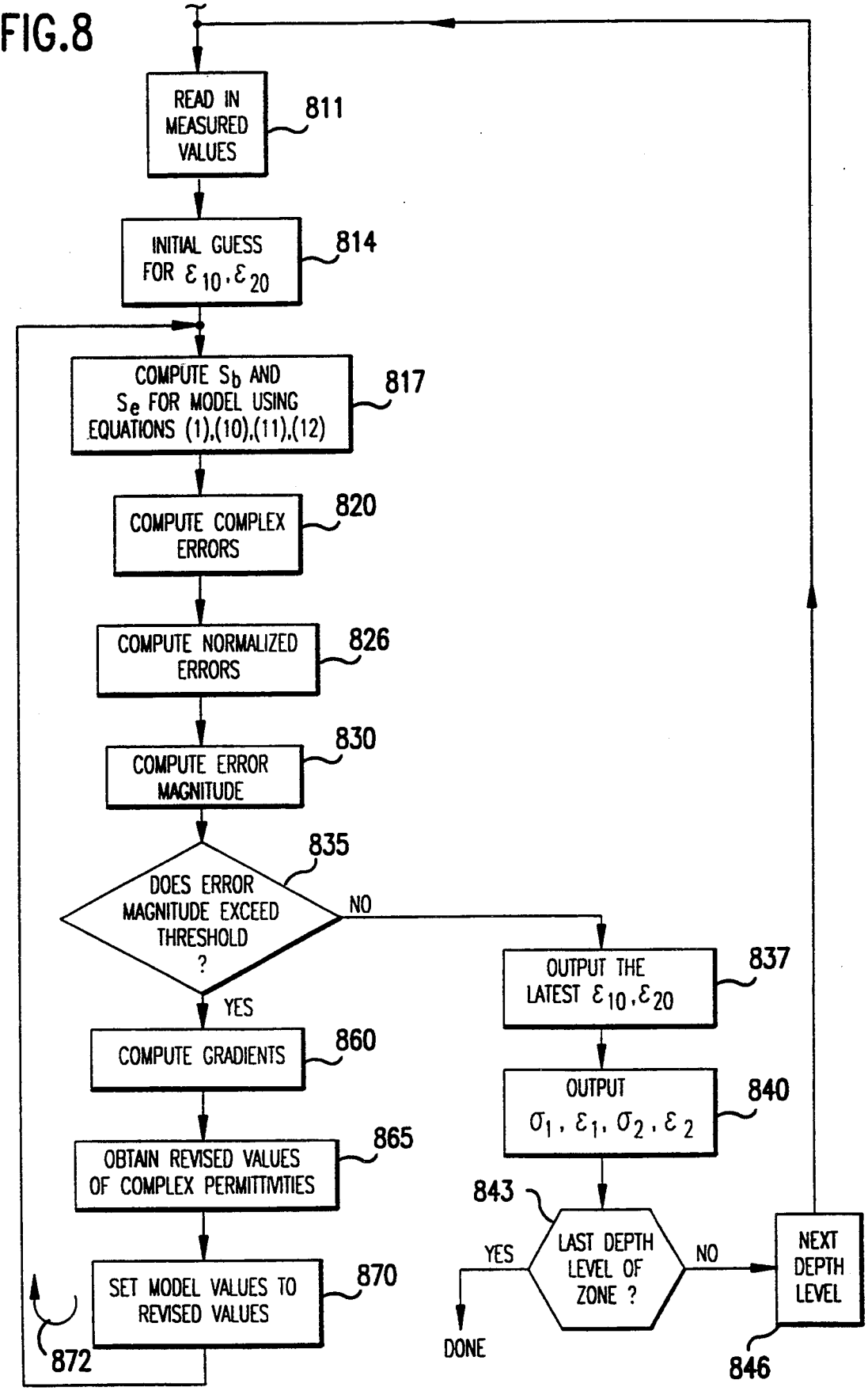
FIG. 8 is a flow diagram of a routine for controlling a processor to perform a technique in accordance with an embodiment of the invention.

FIG. 8 is a flow diagram of a routine for controlling a processor, for example computing module 85 of FIG. 1 to obtain the permittivity and conductivity of the formation and standoff layer in accordance with the technique just described. It will be understood that the described routine could be performed by a processor at the well site (downhole or uphole) or by a processor at a location remote from the well site. The block 811 represents the reading of measurement information obtained during logging; that is, the attenuation and phase obtained in the broadside mode ($\alpha_{bm}$, $\Phi_{bm}$) and the attenuation and phase obtained in the endfire mode ($\alpha_{em}$, $\Phi_{em}$) such as from the equipment of FIG. 6. The signal responses can be obtained from equations (13) and (13a) or can alternatively be determined directly. In this embodiment it is also assumed that the standoff layer thickness, h, is known, such as from another logging measurement, and it is also read in. The block 814 is then entered, this block representing the selection of initial model values for the permittivity and conductivity of each layer of the two layer model, these values being designated $\epsilon_{10}'$ and $\alpha_{10}$ for the standoff layer, and $\epsilon_{20}'$ and $\sigma_{20}$ for the formations (which, as noted above, will typically be invaded formations). If determination of these values was already made at an adjacent borehole depth level, such values can be used as the initial guesses for the model values. Alternatively, the initial model values can be determined from the measured values by assuming a simplified model (e.g. FIG. 2B) in the above relationships. For example, the broadside mode measurements can be employed in the simplified model to obtain the initial model values for the standoff layer, and the endfire mode measurements can be used to obtain the initial model values for the formations. The broadside mode measurements are inherently shallower than the endfire mode measurements.

The block 817 is then entered, this block representing the determination of the complex quantities $S_b$ and $S_e$ for the model from equations (1), (10), (11) and (12). The complex errors, e and b can then be determined from equations (14) and (14a), as represented by the block 820.

There are various error acceptability criteria that can be used. In the present embodiment normalized error values are computed as $$\overline{e} = e/S_{em} \quad (22)$$
$$\overline{b} = b/S_{bm} \quad (23)$$

as represented by the block 826. The error magnitude is then computed as the sum of the absolute values [which, for each complex normalized error is the square root of the sum of the squares of the real and imaginary parts] of the normalized errors. This is represented by the block 830. The error magnitude is then compared against a predetermined error threshold (diamond 835). If the error is too large, the block 860 is entered, this block representing the computation of the gradient of the error in accordance with matrix equation (16). The revised model values $\epsilon_1$ and $\epsilon_2$ are then computed (block 865) in accordance with matrix equation (17) [or individual equations (20) and (21). The complex model values $\epsilon_{10}$, $\epsilon_{20}$ are then set equal to the computed revised model values, $\epsilon_1$, $\epsilon_2$, respectively, as represented by the block 870. The block 817 is then re-entered, and the loop 872 is continued until the error magnitude does not exceed the error threshold. [It will be understood that a loop counter can be used to determine situations where convergence is not obtained after a reasonable number of iterations.] In this case, block 837 is entered, and the present $\epsilon_{10}$ and $\epsilon_{20}$ are read out, stored and/or printed for the depth level being processed. The permittivity and conductivity of the standoff layer and the formations [equations (8) and (9)] can also be read out, stored, and/or printed, as represented by the block 840. In each case, the permittivity ($\epsilon_1'$ or $\epsilon_2'$) is the real part of the complex permittivity, and the conductivity ($\sigma_1$ or $\sigma_2$) is the imaginary part of the complex permittivity divided by $\omega\epsilon_0$. Determination can then be made (diamond 843) as to whether the last depth level of a zone being processed has been considered. If not, the block 846 is re-entered and the routine is continued until all depth levels of interest have been treated.

The described technique is useful, for example, when the standoff layer thickness, h, is known, for example from another logging measurement [see, for example, U.S. Pat. No. 4,692,908] or from other information about the zone being logged and the borehole fluid. With h "known", there are four unknowns and four independent measurements (attenuation and phase from broadside mode and from endfire mode). However if h is unknown it can be difficult or impossible to accurately determine the four indicated unknowns from the available information. Solution of this problem is one of the advantages of the following embodiments.

Figure 9:
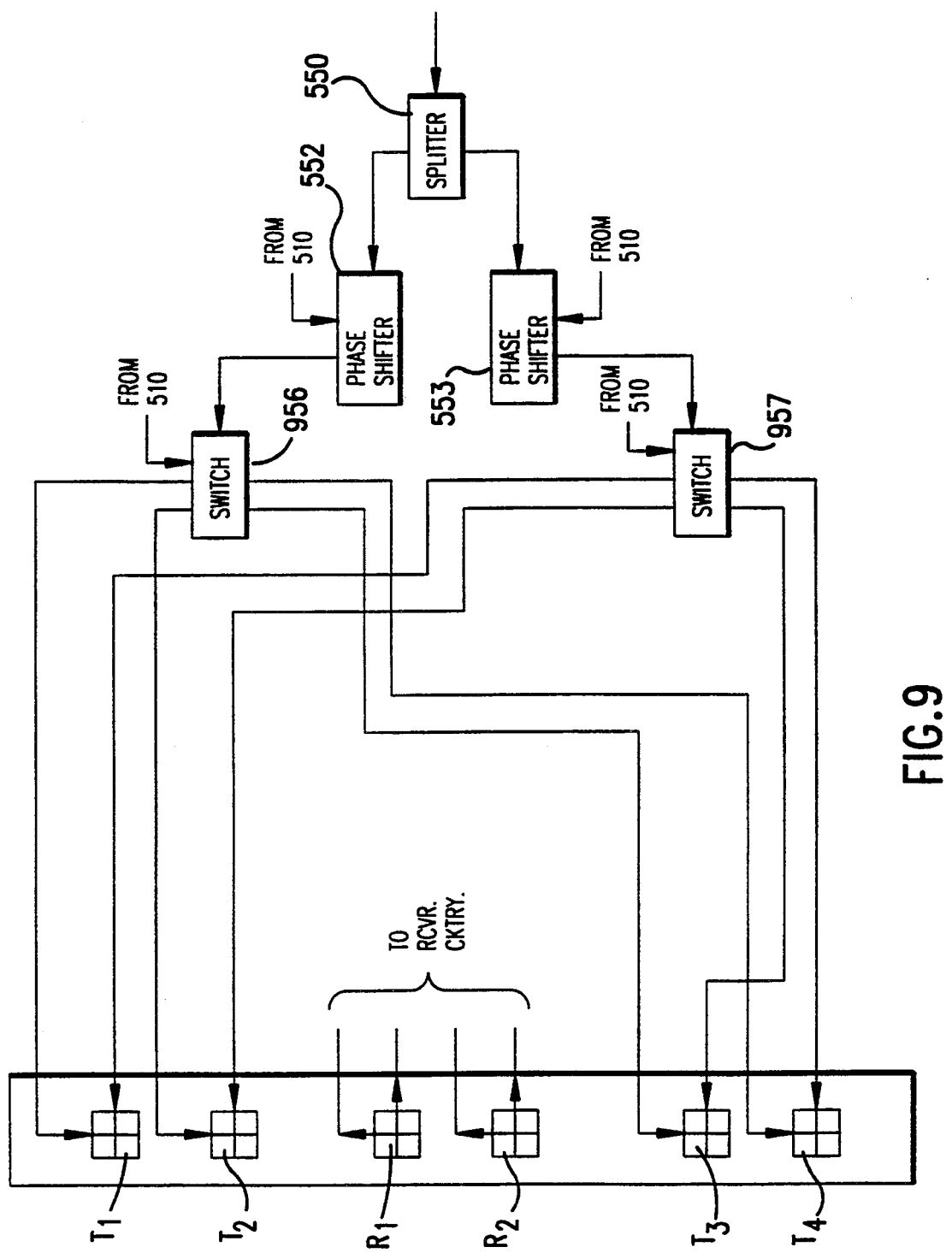
FIG. 9 is a schematic diagram, partially in block form, of a further embodiment of the invention that utilizes six antennas in a pad, and a portion of the electronics coupled with the antennas.

FIG. 9 illustrates a pad 937, for the device of FIG. 1, in accordance with a further embodiment of the invention. Six cross-dipole antennas are configured in an arrangement that can, for initial purposes, be considered as operating in a TT-RR-TT mode. In FIG. 9 the antennas are labelled $T_1$, $T_2$, $R_1$, $R_2$, $T_3$, $T_4$. The array can operate in a relatively short-spacing borehole-compensated mode ($T_2$-$R_1R_2$-$T_3$), or in a relatively long-spacing borehole-compensated mode ($T_1$-$R_1R_2$-$T_4$). The associated circuitry can be similar to that of FIG. 6. As shown in FIG. 9, splitter 550 and phase shifters 552, 553 can serve the same functions as components of the like reference numerals in FIG. 6. Switches 956 and 957 operate in a manner similar to their counterparts 556, 557 of FIG. 6. In this case, however, each switch has five positions. Switch 956 couples to the broadside mode probes of the four respective transmitters and to a position of passing no signal. Switch 957 couples to the endfire mode probes of the four respective transmitters and to a position of passing no signal. The remainder of the circuitry (not shown) can be similar to that of FIG. 6. Operation can be similar to that described in conjunction with the flow diagram of FIG. 7. In this case, however, after a cycle of data collection for transmission by $T_2$, $T_3$, a subsequent similar cycle would be implemented for transmission by $T_1$, $T_4$. The result will be determination of eight measurement values.

For the configuration of FIG. 9, using notation similar to above, $S_{e1}$ and $S_{b1}$ are respectively the endfire and broadside complex signal responses for the shorter spacing [from $T_2$, $T_3$] and $S_{e2}$ and $S_{b2}$ are respectively the endfire and broadside complex signal responses for the longer spacing [from $T_1$, $T_4$]. In this case, we have $$G \cdot \Delta \bar{x} = -\bar{M} \tag{24}$$

-continued $$\bar{M} = \begin{bmatrix} e_1 \\ b_1 \\ e_2 \\ b_2 \end{bmatrix} \tag{25}$$

$$\begin{aligned} e_1 &= S_{e1} - S_{em1} \\ b_1 &= S_{b1} - S_{bm1} \\ e_2 &= S_{e2} - S_{em2} \\ b_2 &= S_{b2} - S_{bm2} \end{aligned} \tag{26}$$

$$\Delta x = \begin{bmatrix} (\epsilon_2 - \epsilon_{20}) \\ (\epsilon_1 - \epsilon_{10}) \end{bmatrix} \tag{27}$$

$$G = \begin{bmatrix} \dfrac{\partial e_1}{\partial \epsilon_2} & \dfrac{\partial e_1}{\partial \epsilon_1} \\ \dfrac{\partial b_1}{\partial \epsilon_2} & \dfrac{\partial b_1}{\partial \epsilon_1} \\ \dfrac{\partial e_2}{\partial \epsilon_2} & \dfrac{\partial e_2}{\partial \epsilon_1} \\ \dfrac{\partial b_2}{\partial \epsilon_2} & \dfrac{\partial b_2}{\partial \epsilon_1} \end{bmatrix} \tag{28}$$

The matrix equation (24) represents eight real scalar equations in five real scalar unknowns ($\epsilon_1$, $\epsilon_3$, h) [or $\epsilon_1'$, $\sigma_1$, $\epsilon_2'$, $\sigma_2$, h]. This corresponds to an overdetermined system of equations which can be solved, for example, by a least square method, to obtain $$\bar{x} = \bar{x}_0 - [G^t \cdot G]^{-1} \cdot G^t \cdot \bar{M} \tag{29}$$

where the t superscript denotes transposition with complex conjugation and $$\bar{x} = \begin{bmatrix} \epsilon_2 \\ \epsilon_1 \end{bmatrix} \tag{30}$$

$$\bar{x}_0 = \begin{bmatrix} \epsilon_{20} \\ \epsilon_{10} \end{bmatrix} \tag{31}$$

Two approaches are illustrated herein for solving in the overdetermined case. In the first approach, described in conjunction with the flow diagram of FIG. 10, h is varied between upper and lower limits (e.g. 0.1 inch and 1.0 inch), and a solution is found for each h. The h that gives the smallest error magnitude is then selected, in conjunction with the corresponding model parameters. In the second approach, described in conjunction with the flow diagram of FIG. 11, h is treated as one of five unknowns for inversion using matrix equations (24) and (29), but where $\Delta \bar{x}$, G, $\bar{x}$ and $\bar{x}_0$ are as follows:

$$\Delta \bar{x} = \begin{bmatrix} \epsilon_2 - \epsilon_{20} \\ h - h_0 \\ \epsilon_1 - \epsilon_{10} \end{bmatrix} \tag{32}$$

$$G = \begin{bmatrix} \frac{\partial e_1}{\partial \epsilon_2} & \frac{\partial e_1}{\partial h} & \frac{\partial e_1}{\partial \epsilon_1} \\ \frac{\partial b_1}{\partial \epsilon_2} & \frac{\partial b_1}{\partial h} & \frac{\partial b_1}{\partial \epsilon_1} \\ \frac{\partial e_2}{\partial \epsilon_2} & \frac{\partial e_2}{\partial h} & \frac{\partial e_2}{\partial \epsilon_1} \\ \frac{\partial b_2}{\partial \epsilon_2} & \frac{\partial b_2}{\partial h} & \frac{\partial b_2}{\partial \epsilon_1} \end{bmatrix} \quad (33)$$

$$\overline{x} = \begin{bmatrix} \epsilon_2 \\ h \\ \epsilon_1 \end{bmatrix} \quad (34)$$

$$\overline{x}_0 = \begin{bmatrix} \epsilon_{20} \\ h_0 \\ \epsilon_{10} \end{bmatrix} \quad (35)$$

Figure 10:
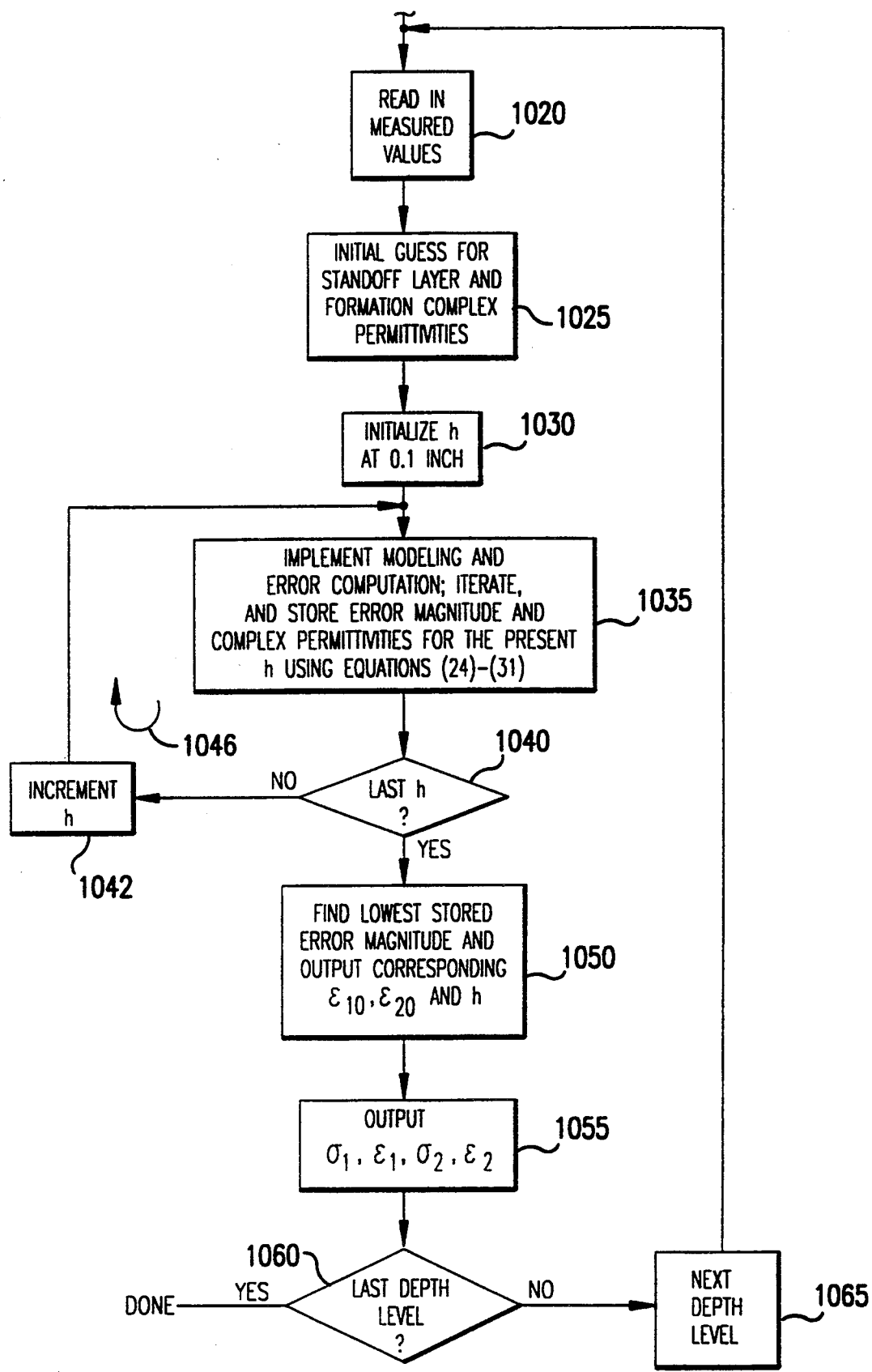
FIG. 10 is a flow diagram of a routine for controlling a processor to perform a technique in accordance with a further embodiment of the invention.
Figure 11:
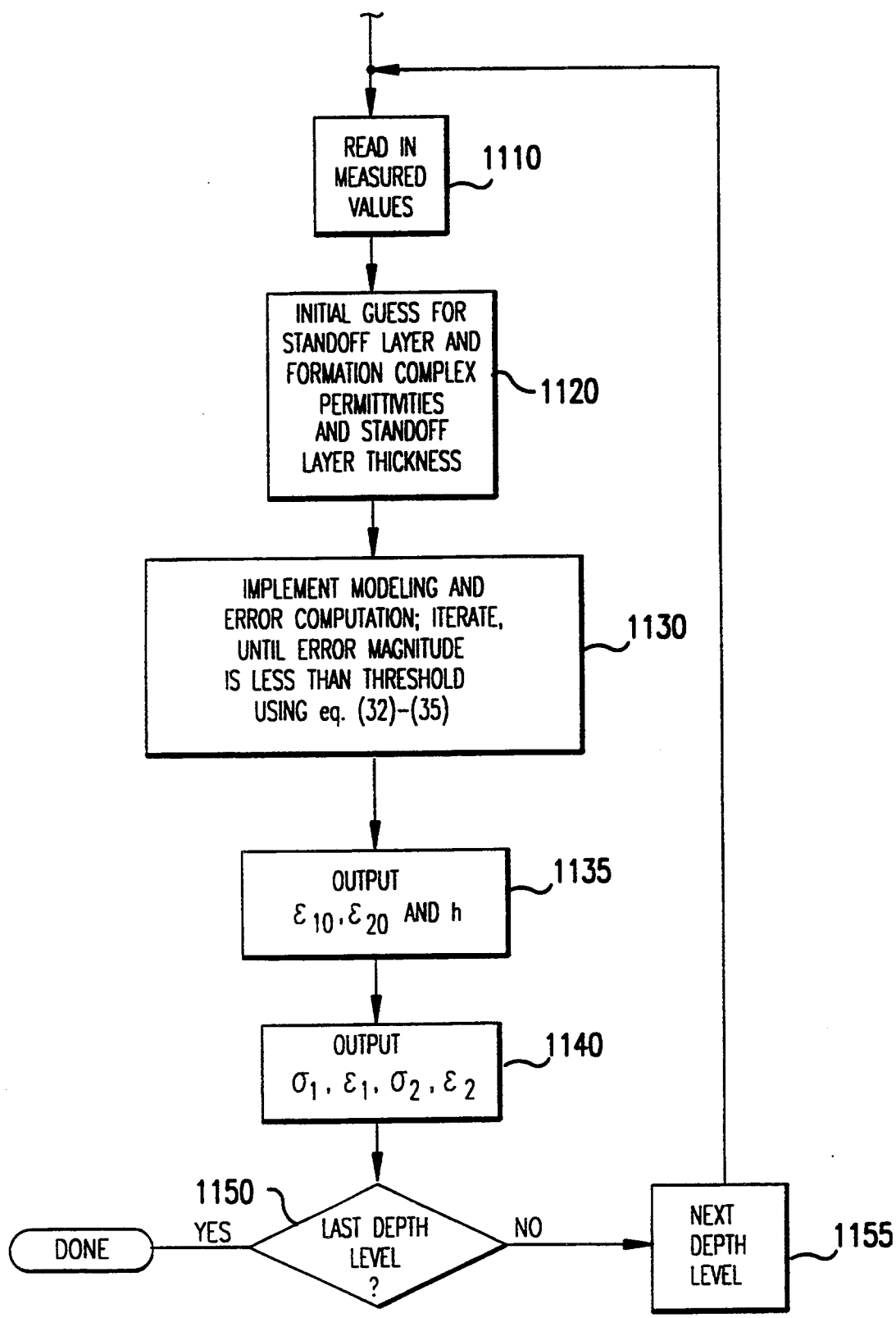
FIG. 11 is a flow diagram of a routine for controlling a processor to perform a technique in accordance with a further embodiment of the invention.

In the flow diagram of FIG. 10, the block 1020 represents the reading in of measured values, and the block 1025 represents the making of the initial guess for standoff layer and formation complex permittivities, the functions of both of these blocks being similar to the corresponding blocks of FIG. 8. The standoff layer thickness, h, is initialized, for example at point 0.1 inch, as represented by the block 1030. The block 1035 is then entered, this block representing the implementing of the modeling and error computation and the iteration and storage of the error magnitude and complex permittivities for the present h. This is the same procedure that was described in conjunction with the flow diagram of FIG. 8, except that in this case the equations (24) through (31) are utilized. Inquiry is then made (diamond 1040) as to whether the last h, for example 1.0 inch, has been reached. If not, h is incremented (block 1042, such as by 0.01 inch, block 1035 is re-entered, and the loop 1046 continues until all h have been considered. The lowest stored error magnitude is then found, and the corresponding complex permittivities are read out, as in the flow diagram of FIG. 8. In this case, however, the value of h which resulted in the lowest error magnitude is also read out. The blocks 1055, 1060 and 1065 correspond to their counterparts in FIG. 8.

In the flow diagram of FIG. 11, the block 1110 again represents the reading in of measured values, and the block 1120 represents the initial guess for the complex permittivities of the standoff layer and the formation. In this case, however, an initial guess is also made for the standoff layer thickness, h. The modeling, error computation, and iteration are then performed as before, until the error magnitude is less than a predetermined threshold, as represented by the block 1130. In this case, however, matrix equations (32) through (35) are utilized. The blocks 1135, 1140, 1150, and 1155 then represent the outputting of result and consideration of subsequent depth levels, as previously described.

Figure 12:
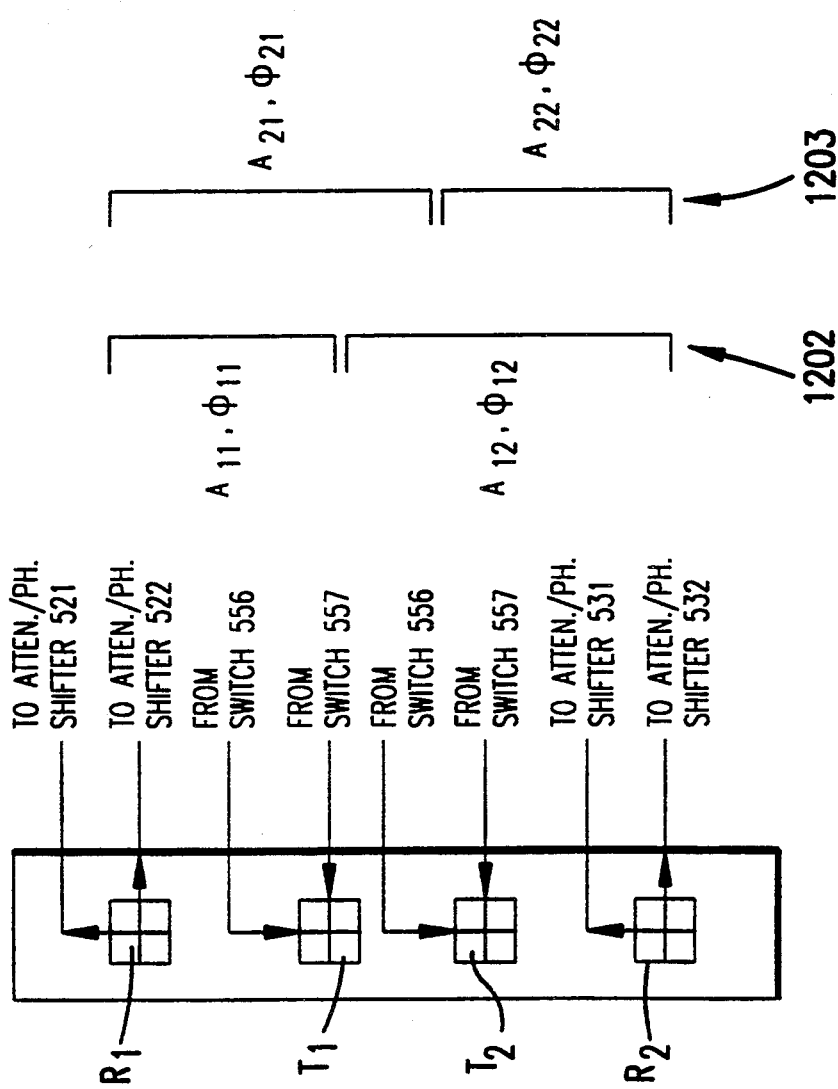
FIG. 12 is a schematic diagram, partially in block form, of a further form of the invention that employs six antennas with four of them used as receivers.

FIG. 12 illustrates an antenna array which can be utilized to achieve borehole-compensated operation in a differential receiver arrangement wherein two transmitting antennas are located between two receiving antennas in an R-TT-R configuration. This type of arrangement can have advantages in hardware implementation. For example, with transmitters closer together, the high power elements can be confined to a smaller region of the logging device. In a further embodiment with six antennas, fewer transmitters (two instead of four) can be used in obtaining two depths of investigation. In the illustration of FIG. 12, the antennas are labeled $R_1$, $T_1$, $T_2$ and $R_2$. The brackets to the right of the antennas are used to conveniently keep track of signal sources and destinations for a subsequent analysis which shows that the configurations with receivers on the ends are reciprocals of the configurations with the transmitters at the ends. The brackets are not intended to represent the electromagnetic wave energy. In the notation to be used, a first subscript represents the transmitter location from which the signal is transmitted and the second subscript represents the receiver location at which the signal is received. Therefore, $A_{jk}$ would represent the attenuation of a signal transmitted from transmitter j and received at receiver k. Similarly, a phase shift $\Phi_{jk}$ would represent the phase shift of a signal transmitted from a transmitter j and received at a receiver k. In FIG. 12, one pair of brackets 1202 represent signals transmitted from transmitter $T_1$ and received at both receivers. The signals received at receiver $R_1$ have attenuation $A_{11}$ and phase shift $\Phi_{11}$, and the signals received at receiver $R_2$ have attenuation $A_{12}$ and phase shift $\Phi_{12}$. The other pair of brackets, 1203, represents signals transmitted from transmitter $T_2$ and received at both receivers. In particular, the signals transmitted from transmitter $T_2$ and received at receiver $R_1$ have attenuation $A_{21}$ and phase shift $\Phi_{21}$, and the signals transmitted from transmitter $T_2$ and received at receiver $R_2$ have an attenuation $A_{22}$ and a phase shift $\Phi_{22}$. The differential attenuation and phase for the signals transmitted from transmitter $T_1$ are $$A_1 = A_{12} - A_{11} \quad (36)$$

$$\Phi_1 = \Phi_{12} - \Phi_{11} \quad (37)$$

Similarly, the differential attenuation and phase for the signals transmitted from the transmitter $T_2$ are $$A_2 = A_{21} - A_{22} \quad (38)$$

$$\Phi_2 = \Phi_{21} - \Phi_{22} \quad (39)$$

The borehole-compensated attenuation can then be represented as $$A = (A_1 + A_2)/2 = (A_{12} - A_{11} + A_{21} - A_{22})/2 \quad (40)$$

and the borehole-compensated phase shift can be represented as $$\Phi = (\Phi_1 + \Phi_2)/2 = (\Phi_{12} - \Phi_{11} + \Phi_{21} - \Phi_{22})/2 \quad (41)$$

The equations (40) and (41) are the same as the equations for conventional borehole-compensated T-RR-T operation, except that the signal represented by each term will be the reverse of the signal for conventional operation. For example, $A_{12}$ will represent a transmitter-to-receiver signal path that is the opposite of the signal for the conventional case that would be transmitted from a transmitter at the indicated $R_2$ position to a receiver at the indicated $T_1$ position. Since the direction of the signal path through the same media will not make a substantial difference, by reciprocity it will be understood that the expressions for A and $\Phi$ in equations (40) and (41) will provide substantially the same result as the case for conventional borehole-compensated differential receiver configuration with the receivers in the middle.

The circuitry for the antenna arrangement of FIG. 12 is very similar to the circuitry for the antenna arrangement of FIG. 6, the connections to the FIG. 6 circuit elements being shown in FIG. 12. The transmitter energizing signals from the switches 557 and 556 are now coupled to the antennas in the center of the array, whereas the receiver circuitry is now coupled with the antennas at the ends of the array. In other respects, operation can be substantially the same as previously described.

Figure 13:
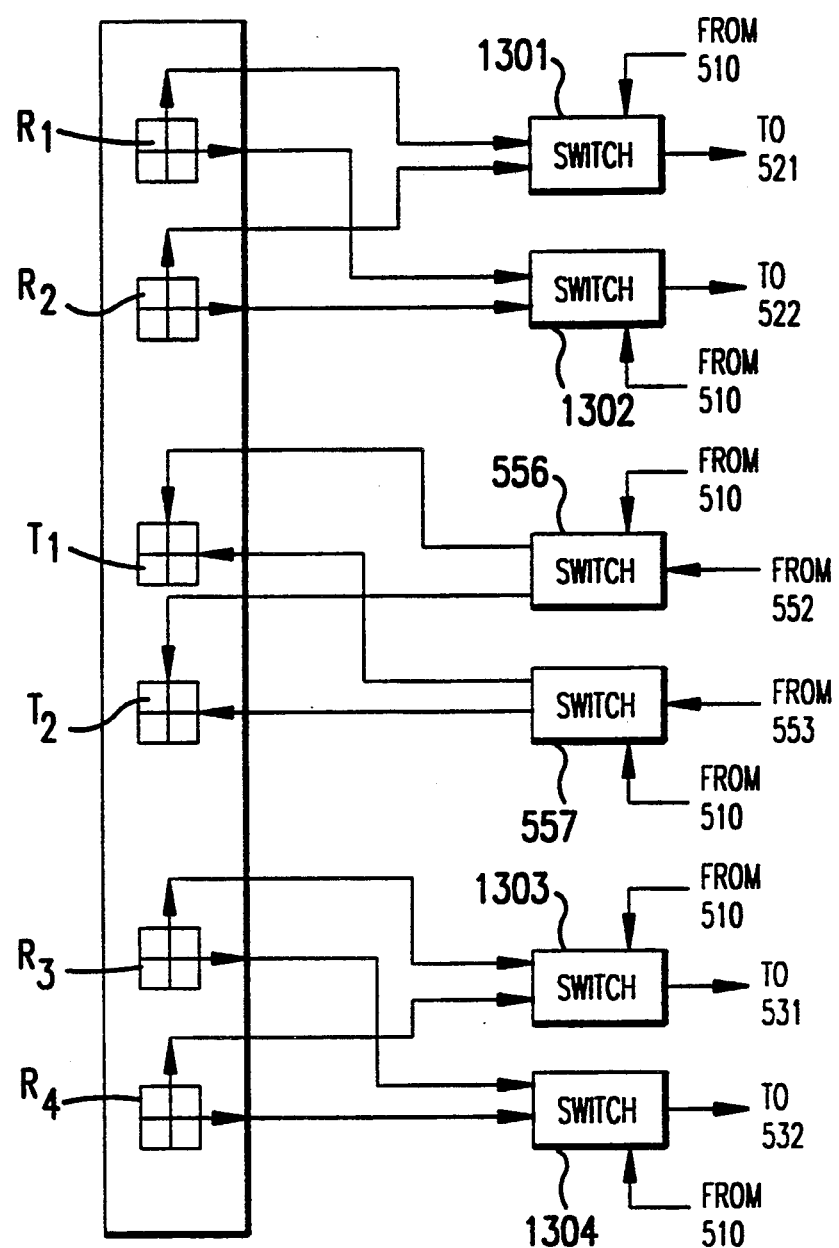
FIG. 13 is schematic diagram, partially in block form, of a further form of the invention that employs an array of four slot antennas with receivers at the ends of the array.

FIG. 13 illustrates a six antenna array of the type first shown in FIG. 9, but with two transmitters in the center and four receivers on the ends to form an arrangement $R_1R_2$-$T_1T_2$-$R_3R_4$. This configuration can be viewed as two R-T-T-R arrangements having different spacings, and therefore different depths of investigation; namely, a first arrangement $R_1$-$T_1T_2$-$R_4$ having a relatively long spacing, and a second arrangement $R_2$-$T_1T_2$-$R_3$ having a relatively short spacing. The circuitry for the antenna arrangement of FIG. 13 is similar to the circuitry for the antenna arrangement shown in FIG. 6. In FIG. 13 the two transmitters receive signals from switches 556 and 557 as in FIG. 6. There are four receivers, the probes of which are coupled with switches 1301, 1302, 1303, and 1304, as seen in the FIGURE. The vertical probes of $R_1$ and $R_2$ are coupled to switch 1301 which passes one of the signals under control of processor 510. Similarly, the horizontal probes of $R_1$ and $R_2$ are coupled to switch 1302, the vertical probes of $R_3$ and $R_4$ are coupled to switch 1303, and the horizontal probes of $R_3$ and $R_4$ are coupled to switch box 1304. In operation, for the shallow depth of investigation the switches 1301–1304 will be controlled to pass signals from $R_2$ and $R_3$, whereas for the deep depth of investigation the switches 1301–1304 are controlled to pass signals from $R_1$ and $R_4$. In other respects, data acquisition can be as described in conjunction with the flow diagram of FIG. 7. Operation can be either simultaneous or sequential, as first described above. Also, will be understood that the antennas of the configurations of FIGS. 9, 12, and 13 can, if desired, have individual probes for operation in a single magnetic dipole or electric dipole mode.

The invention has been described with reference to particular preferred embodiments, but variations within the spirit and scope of the invention will occur to those skilled in the art. For example, it will be understood that other measured signal values can be used with the inversion techniques hereof to determine the conductivity and dielectric permittivity of the standoff layer and the adjacent formations. In the configurations of FIGS. 9 or 13, single probe antennas could be used to obtain either four broadside mode measurements (attenuation and phase for each of two depths of investigation) or four endfire mode measurements. Then, if standoff layer thickness h is known, the technique described in conjunction with the routine of FIG. 8 can be used to make the indicated determinations. Electric dipole measurements, using button electrodes as disclosed in U.S. Pat. No. 4,652,829 can also be used at different depths of investigation and/or in conjunction with magnetic dipole measurements. It will also be understood that non-differential direct measurements and or non-borehole-compensated measurements using a single receiver and-/or a single transmitter could be employed.

We claim:

1. For use in determining properties of formations surrounding an earth borehole having a standoff layer which is traversed by a logging device having transmitting and receiving antennas, a method for determining the conductivity and permittivity of the standoff layer and the conductivity and permittivity of the formations adjacent the standoff layer, comprising the steps of:
   a) deriving first measured signal values from electromagnetic energy transmitted into the formations and received from the formations by said device, said electromagnetic energy having a magnetic dipole characteristic with a first magnetic dipole direction;
   b) deriving second measured signal values from further electromagnetic energy transmitted into the formations and received from the formations by said device, said further electromagnetic energy having a magnetic dipole characteristic with a second magnetic dipole direction that is different than said first magnetic dipole direction;
   c) selecting model values of standoff layer permittivity, standoff layer conductivity, formation permittivity, and formation conductivity;
   d) computing first model signal values based on a model of electromagnetic energy, having a magnetic dipole characteristic with said first magnetic dipole direction, propagating in a model medium that includes a standoff layer having said model values of standoff layer permittivity and standoff layer conductivity and formations having said model values of formation permittivity and formation conductivity;
   e) computing second model signal values based on a model of electromagnetic energy, having a magnetic dipole characteristic with said second magnetic dipole direction, propagating in a model medium that includes standoff layer having said model values of standoff layer permittivity and standoff layer conductivity and formations having said model values of formation permittivity and formation conductivity;
   f) computing an error from the difference between the first model signal values and the first measured signal values and the difference between the second model signal values and the second measured signal values;
   g) modifying the model values of step (c);
   h) repeating steps (d) through (g) until a predetermined criterion of said error is met; and
   i) outputting, as determined values, the model values of standoff layer permittivity, standoff layer conductivity, formation permittivity, and formation conductivity.

2. The method as defined by claim 1, wherein said first and second magnetic dipole directions are perpendicular.

3. The method as defined by claim 1, wherein said first magnetic dipole direction is substantially parallel to the longitudinal direction of the borehole at the position of the logging device, and wherein said second magnetic dipole direction is perpendicular to said first magnetic dipole direction.

4. The method as defined by claim 1, wherein the thickness of said standoff layer is known, and wherein said computing steps (d) and (e) are based on a model having said known standoff layer thickness.

5. The method as defined by claim 1, wherein said first measured signal values comprise a first measured attenuation value and a first measured relative phase value, and wherein said second measured values comprise a second measured attenuation value and a second measured relative phase value.

6. The method as defined by claim 1, wherein said step of modifying the model values includes determining the gradient of said error, and determining the modification of said model from said gradient.

7. For use in determining properties of formations surrounding an earth borehole having a standoff layer which is traversed by a logging device having transmitting and receiving antennas, a method for determining the conductivity and permittivity of the standoff layer and the conductivity and permittivity of the formations adjacent the standoff layer, comprising the steps of:

a) deriving first measured signal values from electromagnetic energy transmitted into the formations and received from the formations by said device at a given depth of investigation, said electromagnetic energy having a magnetic dipole characteristic with a first magnetic dipole direction;

b) deriving second measured signal values from second electromagnetic energy transmitted into the formations and received from the formations by said device at a further depth of investigation different than said given depth of investigation, said second electromagnetic energy having a magnetic dipole characteristic with a second magnetic dipole direction;

c) deriving third measured signal values from third electromagnetic energy transmitted into the formations and received from the formations by said device at said given depth of investigation, said third electromagnetic energy having a magnetic dipole characteristic with a third magnetic dipole direction that is different than said first magnetic dipole direction;

d) deriving fourth measured signal values from fourth electromagnetic energy transmitted into the formations and received from the formations by said device at said further depth of investigation, said fourth electromagnetic energy having a magnetic dipole characteristic with a fourth magnetic dipole direction that is different than said second magnetic dipole direction;

e) said steps (a) through (d) being performed in any order;

f) selecting model values of standoff layer permittivity, standoff layer conductivity, standoff layer thickness, formation permittivity, and formation conductivity;

g) computing first model signal values based on a model of electromagnetic energy, having a magnetic dipole characteristic with said first magnetic dipole direction and said given depth of investigation, propagating in a model medium that includes a standoff layer having said model values of standoff layer permittivity, standoff layer conductivity, and standoff layer thickness and formations having said model values of formation permittivity and formation conductivity;

h) computing second model signal values based on a model of electromagnetic energy, having a magnetic dipole characteristic with said second magnetic dipole direction at said further depth of investigation, propagating in a model medium that includes a standoff layer having said model values of standoff layer permittivity, standoff layer conductivity, and standoff layer thickness and formations having said model values of formation permittivity and formation conductivity;

i) computing third model signal values based on a model of electromagnetic energy, having a magnetic dipole characteristic with said third magnetic dipole direction and said given depth of investigation, propagating in a model medium that includes a standoff layer having said model values of standoff layer permittivity, standoff layer conductivity, and standoff layer thickness and formations having said model values of formation permittivity and formation conductivity;

j) computing fourth model signal values based on a model of electromagnetic energy, having a magnetic dipole characteristic with said fourth magnetic dipole direction at said further depth of investigation, propagating in a model medium that includes a standoff layer having said model values of standoff layer permittivity, standoff layer conductivity, and standoff layer thickness and formations having said model values of formation permittivity and formation conductivity;

k) computing an error from the difference between the first model signal values and the first measured signal values, the difference between the second model signal values and the second measured signal values, the difference between the third model signal values and the third measured signal values, and the difference between the fourth model signal values and the fourth measured signal values;

l) modifying the model values of step (f);

m) repeating steps (g) through (l) until a predetermined criterion of said error is met; and n) outputting, as determined values, the model values of standoff layer permittivity, standoff layer conductivity, standoff layer thickness, formation permittivity, and formation conductivity.

8. The method as defined by claim 7, wherein said first and second magnetic dipole directions are perpendicular.

9. The method as defined by claim 7, wherein said first magnetic dipole direction is substantially parallel to the longitudinal direction of the borehole at the position of the logging device, and wherein said second magnetic dipole direction is perpendicular to said first magnetic dipole direction.

10. The method as defined by claim 7, wherein said first measured signal values comprise a first measured attenuation value and a first measured relative phase value, and wherein said second measured values comprise a second measured attenuation value and a second measured relative phase value, and wherein said third measured signal values comprise a third measured attenuation value and a third measured relative phase value, and wherein said fourth measured values comprise a fourth measured attenuation value and a fourth measured relative phase value.

11. The method as defined by claim 7, wherein said step of modifying the model values includes determining the gradient of said error, and determining the modification of said model from said gradient.

12. For use in determining properties of formations surrounding an earth borehole having a standoff layer which is traversed by a logging device having transmitting and receiving antennas, said logging device being operative to:

a) derive first measured signal values from electromagnetic energy transmitted into the formations and received from the formations by said device, said electromagnetic energy having a magnetic dipole characteristic with a first magnetic dipole direction; and b) derive second measured signal values from further electromagnetic energy transmitted into the formations and received from the formations by said device, said further electromagnetic energy having a magnetic dipole characteristic with a second magnetic dipole direction that is different than said first magnetic dipole direction; a method for determining the conductivity and permittivity of the standoff layer and the conductivity and permittivity of the formations adjacent the standoff layer, comprising the steps of:

c) selecting model values of standoff layer permittivity, standoff layer conductivity, formation permittivity, and formation conductivity;

d) computing first model signal values based on a model of electromagnetic energy, having a magnetic dipole characteristic with said first magnetic dipole direction, propagating in a model medium that includes a standoff layer having said model values of standoff layer permittivity and standoff layer conductivity and formations having said model values of formation permittivity and formation conductivity;

e) computing second model signal values based on a model of electromagnetic energy, having a magnetic dipole characteristic with said second magnetic dipole direction, propagating in a model medium that includes standoff layer having said model values of standoff layer permittivity and standoff layer conductivity and formations having said model values of formation permittivity and formation conductivity;

f) computing an error from the difference between the first model signal values and the first measured signal values and the difference between the second model signal values and the second measured signal values;

g) modifying the model values of step (c);

h) repeating steps (d) through (g) until a predetermined criterion of said error is met; and i) outputting, as determined values, the model values of standoff layer permittivity, standoff layer conductivity, formation permittivity, and formation conductivity.

13. The method as defined by claim 12, wherein said first and second magnetic dipole directions are perpendicular.

14. The method as defined by claim 12, wherein said first magnetic dipole direction is substantially parallel to the longitudinal direction of the borehole at the position of the logging device, and wherein said second magnetic dipole direction is perpendicular to said first magnetic dipole direction.

15. The method as defined by claim 12, wherein the thickness of said standoff layer is known, and wherein said computing steps (d) and (e) are based on a model having said known standoff layer thickness.

16. The method as defined by claim 12, wherein said first measured signal values comprise a first measured attenuation value and a first measured relative phase value, and wherein said second measured values comprise a second measured attenuation value and a second measured relative phase value.

17. The method as defined by claim 12, wherein said step of modifying the model values includes determining the gradient of said error, and determining the modification of said model from said gradient.

18. Apparatus for determining properties of formations surrounding an earth borehole having a standoff layer, comprising:

a logging device movable through the borehole, said logging device having transmitting and receiving antennas;

a) means for deriving first measured signal values for electromagnetic energy transmitted into the formations and received from the formations by said device, said electromagnetic energy having a magnetic dipole characteristic with a first magnetic dipole direction;

b) means for deriving second measured signal values from further electromagnetic energy transmitted into the formations and received from the formations by said device, said further electromagnetic energy having a magnetic dipole characteristic with a second magnetic dipole direction that is different than said first magnetic dipole direction;

c) means for establishing selected model values of standoff layer permittivity, standoff layer conductivity, formation permittivity, and formation conductivity;

d) means for computing first model signal values based on a model of electromagnetic energy, having a magnetic dipole characteristic with said first magnetic dipole direction, propagating in a model medium that includes a standoff layer having said model values of standoff layer permittivity and standoff layer conductivity and formations having said model values of formation permittivity and formation conductivity;

e) means for computing second model signal values based on a model of electromagnetic energy, having a magnetic dipole characteristic with said second magnetic dipole direction, propagating in a model medium that includes standoff layer having said model values of standoff layer permittivity and standoff layer conductivity and formations having said model values of formation permittivity and formation conductivity;

f) means for computing an error from the difference between the first model signal values and the first measured signal values and the difference between the second model signal values and the second measured signal values;

g) means for modifying the model values selected by said selecting means;

h) means for iteratively operating the means (d) through (g) until a predetermined criterion of said error is met; and i) means for outputting the model values of standoff layer permittivity, standoff layer conductivity, formation permittivity, and formation conductivity.

19. Apparatus as defined by claim 18, wherein said first and second magnetic dipole directions are perpendicular.

20. Apparatus for determining properties of formations surrounding an earth borehole, comprising:

a logging device moveable through the borehole;

a member mounted on said logging device and adapted for engagement with the borehole wall;

a linear array comprising four spaced apart slot antennas in said member, said antennas being arranged in an $R_1T_1T_2R_2$ arrangement, where T denotes a transmitter and R denotes a receiver;

means for energizing said transmitting antennas to transmit electromagnetic energy into said formations;

means for receiving, at said receiving antennas, said electromagnetic energy; and means for determining the relative phase shift and the relative attenuation of the received electromagnetic energy.

21. Apparatus as defined by claim 20, wherein each of said antennas is a cross-dipole antenna having orthogonal probes in its slot.

22. Apparatus as defined by claim 21, wherein said energizing means includes means for separately energizing the probes of said transmitting antennas.

23. Apparatus as defined by claim 21, wherein said energizing means includes means for sequentially energizing the probes of said transmitting antennas.

24. Apparatus for determining properties of formations surrounding an earth borehole, comprising:

a logging device moveable through the borehole;

a member mounted on said logging device and adapted for engagement with the borehole wall;

a linear array comprising six spaced apart slot antennas respectively comprising six linearly arranged slots in said member, said antennas being arranged in a $T_1T_2R_1R_2T_3T_4$ arrangement, where a T denotes a transmitter and an R denotes a receiver;

means for energizing antennas $T_1$, $T_2$, $T_3$ and $T_4$ to transmit electromagnetic energy into said formations;

means for receiving said electromagnetic energy at the antennas $R_1$ and $R_2$; and means for determining the relative phase shift and the relative attenuation of the received electromagnetic energy.

25. Apparatus as defined by claim 24, wherein each of said antennas is a cross-dipole antenna having orthogonal probes in its slot.

26. Apparatus as defined by claim 25, wherein said energizing means includes means for separately energizing the probes of said transmitting antennas.

27. Apparatus as defined by claim 25, wherein said energizing means includes means for sequentially energizing the probes of said transmitting antennas.

28. Apparatus for determining properties of formations surrounding an earth borehole, comprising:

a logging device moveable through the borehole;

a member mounted on said logging device and adapted for engagement with the borehole wall;

a linear array comprising six spaced apart slot antennas respectively comprising six linearly arranged slots in said member, said antennas being arranged in an $R_1R_2T_1T_2R_3R_4$ arrangement, where a T denotes a transmitter and an R denotes a receiver;

means for energizing antennas $T_1$ and $T_2$ to transmit electromagnetic energy into said formations;

means for receiving said electromagnetic energy at antennas $R_1$, $R_2$, $R_3$ and $R_4$; and means for determining the relative phase shift and the relative attenuation of the received electromagnetic energy.

29. Apparatus as defined by claim 24, wherein each of said antennas is a cross-dipole antenna having orthogonal probes in its slot.

30. Apparatus as defined by claim 29, wherein said energizing means includes means for separately energizing the probes of said transmitting antennas.

31. Apparatus as defined by claim 29, wherein said energizing means includes means for sequentially energizing the probes of said transmitting antennas.

* * * * *